(12) United States Patent
Ohta et al.

(10) Patent No.: US 6,268,930 B1
(45) Date of Patent: *Jul. 31, 2001

(54) SYSTEM FOR JUDGING WHETHER COLOR DATA IS WITHIN A GAMUT OF AN OUTPUT DEVICE

(75) Inventors: Kenichi Ohta, Kawasaki; Manabu Ohga; Takashi Yabe, both of Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/314,948

(22) Filed: Sep. 29, 1994

(30) Foreign Application Priority Data

| Sep. 29, 1993 | (JP) | 5-242962 |
| Nov. 15, 1993 | (JP) | 5-285281 |
| Jun. 29, 1994 | (JP) | 6-147597 |
| Sep. 26, 1994 | (JP) | 6-229714 |
| Sep. 26, 1994 | (JP) | 6-229715 |

(51) Int. Cl.⁷ .............. G06F 15/00; G03F 3/08
(52) U.S. Cl. .............. 358/1.9; 358/518; 358/520
(58) Field of Search .............. 358/518, 520, 358/521, 523, 504, 296, 1.9; 382/167, 162, 163; H04N 1/60

(56) References Cited

U.S. PATENT DOCUMENTS

| 4,731,662 | | 3/1988 | Udagawa et al. | 358/75 |
| 5,185,661 | | 2/1993 | Ng | 358/518 |
| 5,241,373 | * | 8/1993 | Kanamori | 358/518 |
| 5,299,291 | | 3/1994 | Ruetz | 395/109 |
| 5,317,426 | * | 5/1994 | Hoshimo | 358/515 |
| 5,377,024 | * | 12/1994 | Dillinger | 358/520 |
| 5,398,120 | * | 3/1995 | Friedman et al. | 358/501 |
| 5,448,379 | * | 9/1995 | Ishihara et al. | 358/518 |
| 5,450,216 | * | 9/1995 | Kasson | 358/518 |
| 5,510,910 | * | 4/1996 | Bockman et al. | 358/502 |
| 5,519,515 | * | 5/1996 | Komatsu | 358/518 |
| 5,583,666 | * | 12/1996 | Ellson et al. | 358/518 |
| 5,594,558 | * | 1/1997 | Usami et al. | 358/520 |
| 5,596,428 | * | 1/1997 | Tytgat et al. | 358/518 |
| 5,657,068 | * | 8/1997 | Ohta | 358/296 |
| 5,659,406 | * | 8/1997 | Imas et al. | 358/518 |
| 5,724,442 | * | 3/1998 | Ogatsu et al. | 382/167 |
| 5,909,291 | * | 6/1999 | Myers et al. | 358/523 |

FOREIGN PATENT DOCUMENTS

| 0486311 | 11/1991 | (EP) . |
| 0488656 | 11/1991 | (EP) . |
| 0494034 | 11/1991 | (EP) . |

OTHER PUBLICATIONS

Color Gamut Mapping and the Printing of Digital Color Images, ACM Transactions on Graphics, vol. 7, No. 4, pp. 249–292 (Oct. 1988).

* cited by examiner

*Primary Examiner*—Madeleine Nguyen
(74) *Attorney, Agent, or Firm*—Fitzpatrick, Cella, Harper & Scinto

(57) ABSTRACT

A color image processing system includes storage of plural specific color data representing a gamut of an output device and judgment of whether input color image data is within the gamut of the output device, the judgment performed based on a positional relationship among a plane defined by the plural specific color data, predetermined color data within the gamut of the output device, and the input color image data.

19 Claims, 21 Drawing Sheets

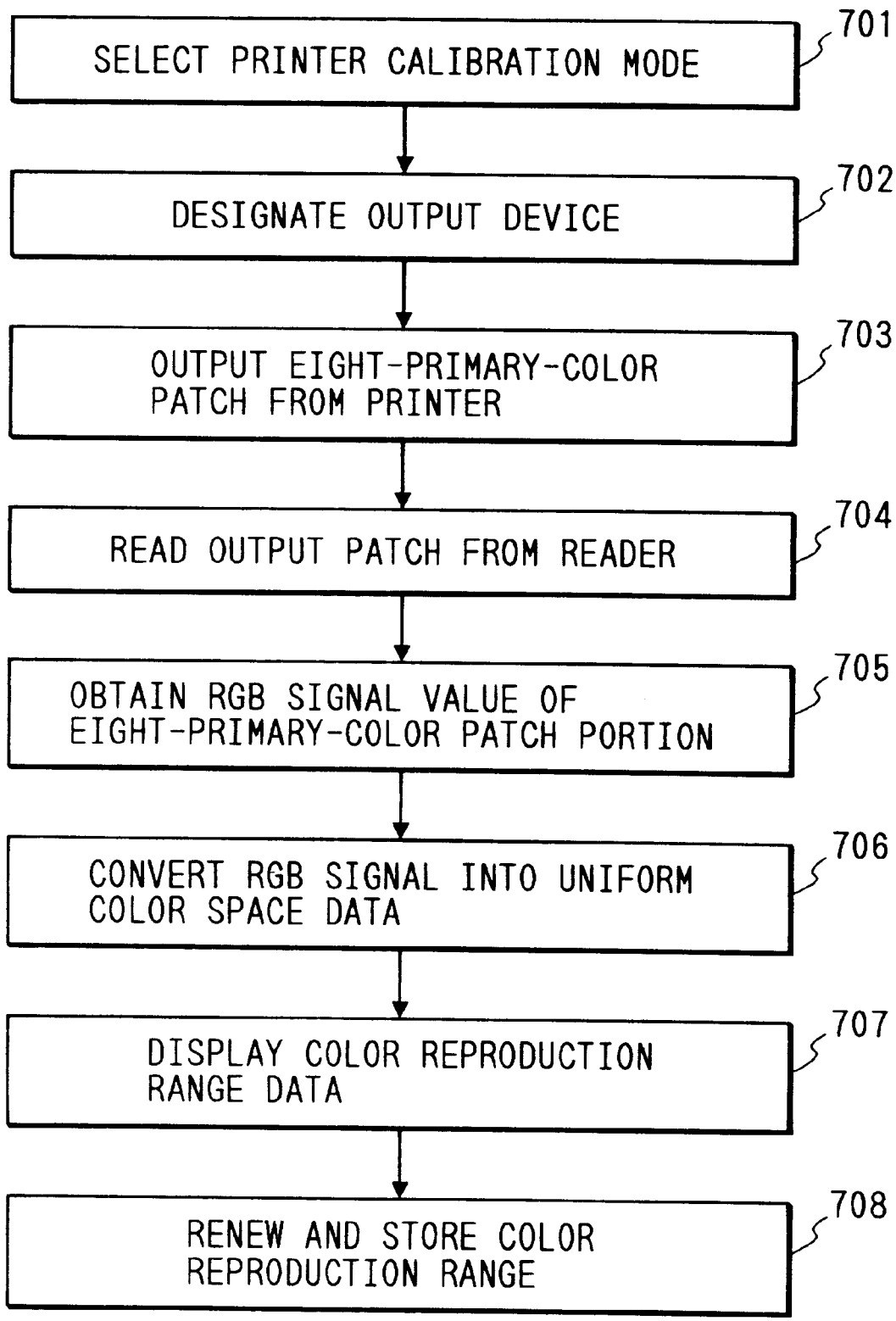

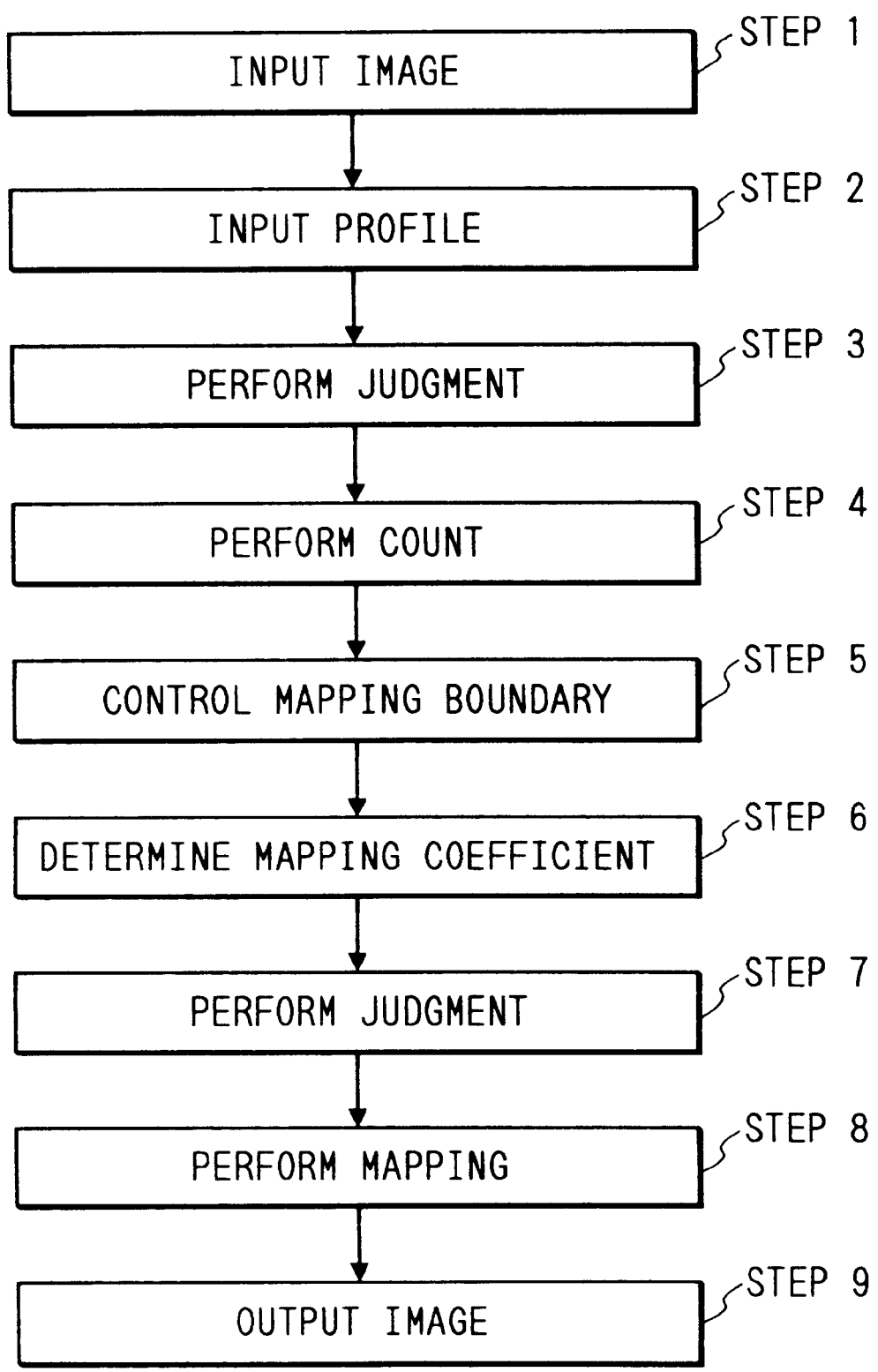

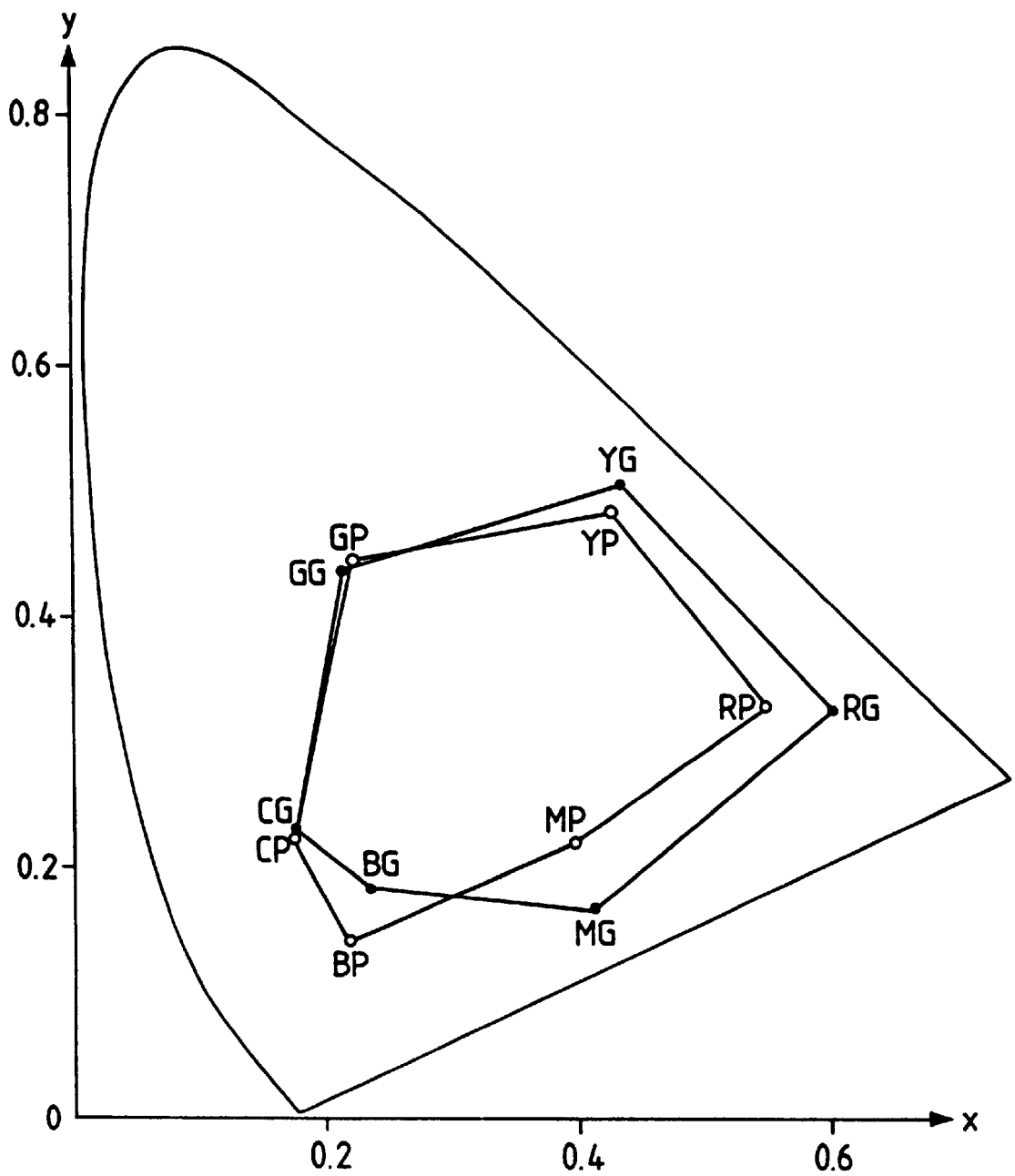

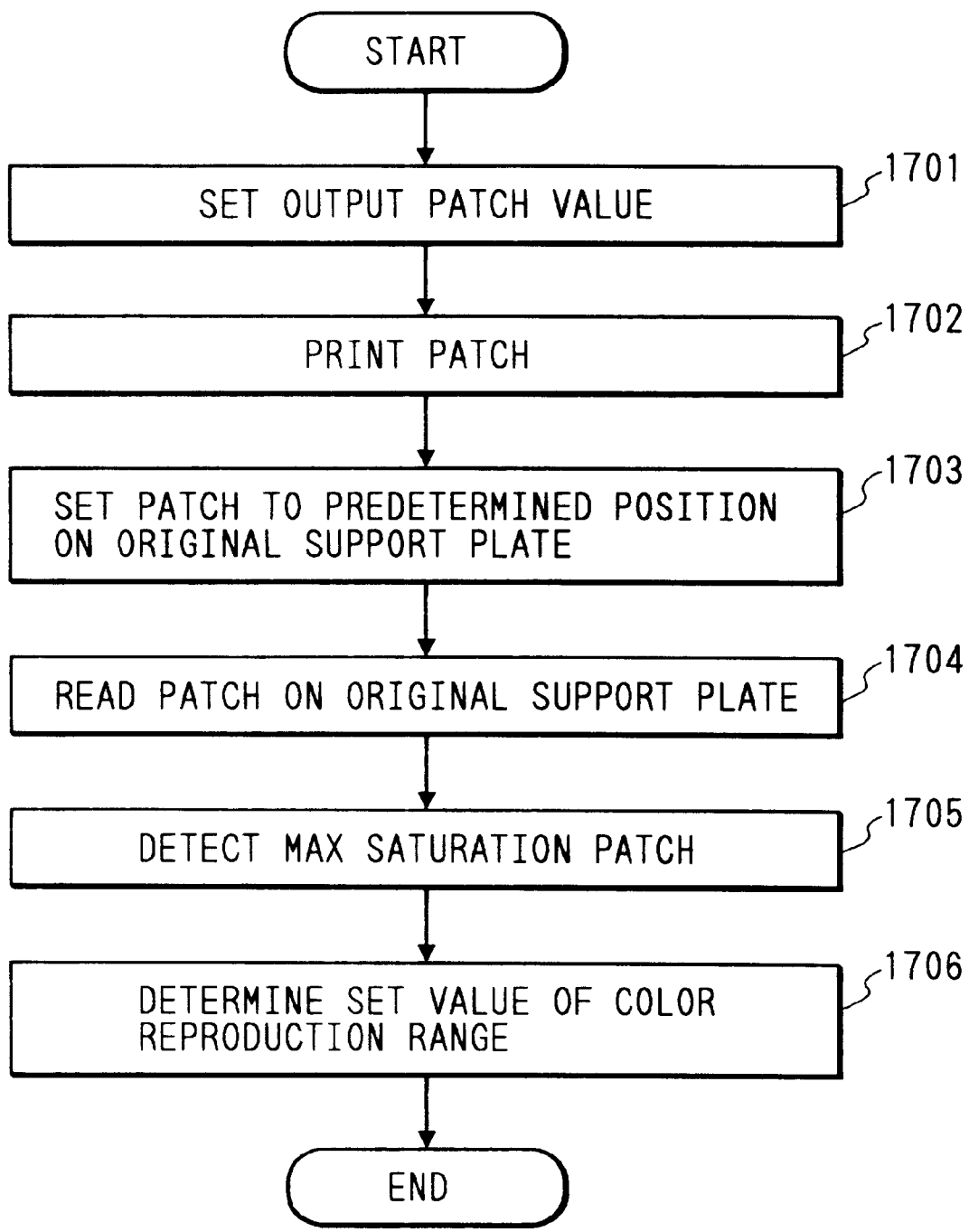

SYSTEM FOR JUDGING WHETHER COLOR DATA IS WITHIN A GAMUT OF AN OUTPUT DEVICE

BACKGROUND OF THE INVENTION

1. Field of the Invention

The present invention relates to an image processing method for processing the color space of image data according to the color reproducing region of the image output apparatus, and an apparatus adapted for executing such image processing method.

2. Related Background Art

With the extensive spreading of personal computers and the similar equipment in recent years, there are increasing the opportunities of preparing or processing a color image on the computer, and observing the image on the color display or releasing the prepared image on paper by the hard copying apparatus or ink jet printer.

In such case, the color reproducing ability varies depending on the image output device (for example hard copying apparatus or ink jet printer), and there is therefore no guarantee that the color observed on the monitor is faithfully reproduced on the hard copy. In particular, as the color reproduction range of the hard copying device is generally narrower than that of the color monitor, the color which can be represented on the monitor but is outside the color reproduction range of the hard copying device cannot, in most cases, be reproduced on the hard copy.

For avoiding such drawback, there can be conceived a method, for example, of preparing a look-up table by predetermining, for all the combinations of color signals of the color image, whether they belong to the color reproduction range of the image output device and providing an alarm in case the entered color signal is outside the color reproduction range.

Such method is however associated with a drawback that a very large memory capacity is required for such look-up table because the number of combinations of the color signals is enormous. The required memory capacity becomes even larger in case plural image output devices are employed, as the look-up table has to be prepared for each of such image output devices.

Also as already mentioned above, the color reproducing ability of the color hard copy varies depending on the system used. For example, while the silver halide photography can reproduce the image to a maximum density of about 2.0, the color copying machine can only reproduce the image to a maximum density of about 1.8.

Consequently, when a silver halide-based photograph is copied on a color copying machine, the high density areas of the photograph become saturated, so that the information originally contained in the image becomes eventually lost partially.

Stated differently, when an original image, of which information overflows the color reproduction range of the image output device, is copied with such device, the information originally contained in the image is inevitably lost.

For this reason, there have been conceived methods of color space compression, for converting the color signals of the input original image so as to be inside the color reproduction range of the image output device, in the course of supply of the input original image to the image output device.

However, as the color reproduction range of the image output device is predetermined in the beginning, such methods are incapable of adapting to the variation in the color reproduction range resulting from the machine-to-machine fluctuation, the difference in ambient conditions or the long-term performance variation of the machine.

In the conventional example explained above, a same value is used for different apparatus, though the color reproduction range is in fact different from apparatus to apparatus, because of the fluctuation of individual apparatus, difference in ambient condition of the site of installation and time-dependent variation of the performance.

Consequently, if the initially set color reproduction range is narrower than the actual range, the obtained image is represented in a range narrower than the available range, so that the actually available color reproduction range is not effectively utilized.

On the other hand, if the initially set color reproduction range is wider than the actual range, the total rendition may become saturated as the apparatus tries to reproduce the rendition which cannot be reproduced.

In such case, the color space compression explained above cannot be effectively utilized.

SUMMARY OF THE INVENTION

An ojbect of the present invention is to provide a color image processing apparatus and a color image processing method, enabling to define the color reproduction range for each image output device with a limited memory capacity.

The above-mentioned object can be attained, according to a preferred embodiment of the present invention, by an image processing apparatus comprising generation means for generating plural color image data of mutually different hues, corresponding substantially to limit saturation produceable on the output device, and interpolation means for generating, by interpolation from plural color image data, a boundary plane of the reproduction range produceable by said output device.

Another object of the present invention is to enable precise judgment whether the input image can be produced by the output device.

Still another object of the present invention is to enable production of an image faithful to the input image data by output means.

Still another object of the present invention is to judge and set, in simple manner, the color reproduction range corresponding to the machine-to-machine fluctuation, the ambient condition of site of installation and the long-term variation in performance.

Still another object of the present invention is to enable utilization of the color reproduction ranges respectively corresponding to plural process modes.

Still another object of the present invention is to cause the data, representing the color reproduction range of output means of an external equipment, to correspond to the machine-to-machine fluctuation, the ambient conditions of site of installation and the long-term variation of performance.

Still other objects of the present invention, and the features thereof, will become fully apparent from the following description of the embodiments, which is to be taken in conjunction with the attached drawings.

BRIEF DESCRIPTION OF THE DRAWINGS

FIG. 7 is a flow chart showing a control sequence of printer calibration process;

FIG. 12 is a flow chart showing the process control sequence of the fifth embodiment;

FIG. 23 is a chart showing an example of the difference in the color reproduction range between the printer and the original;

FIG. 25 is a flow chart showing an example of the image processing in the variation 1 of the sixth embodiment of the present invention;

DETAILED DESCRIPTION OF THE PREFERRED EMBODIMENTS

[1st embodiment]

Figure 1:
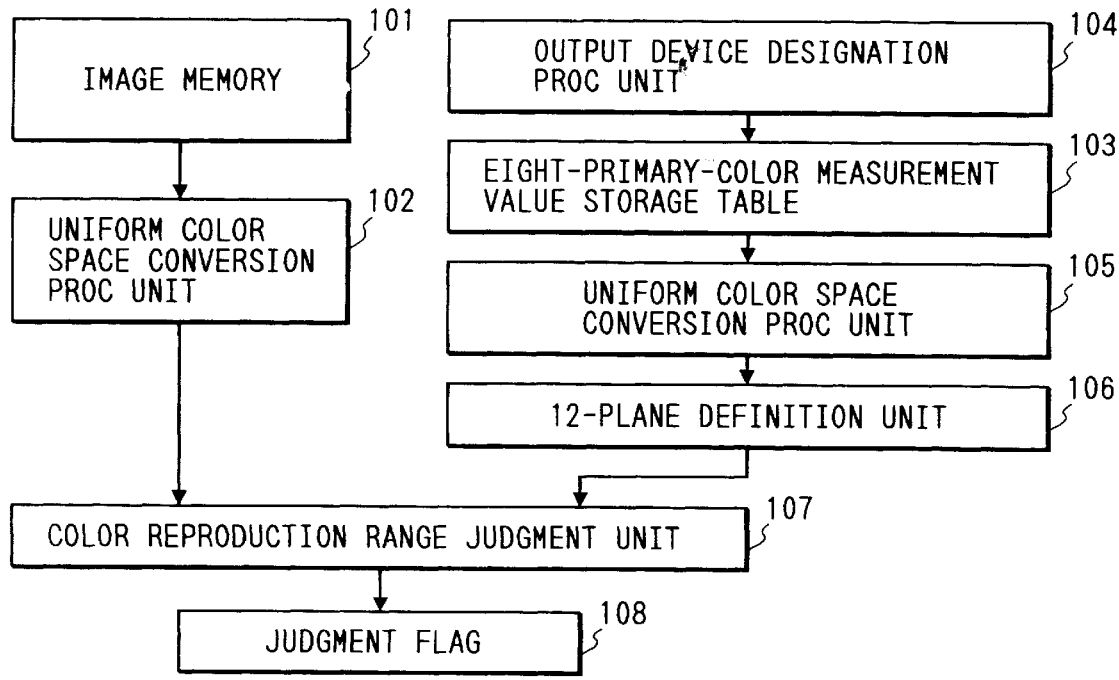
FIG. 1 is a block diagram showing a color reproduction range judging process in a color conversion device constituting an embodiment of the present invention.

FIG. 1 is a block diagram showing the flow of a color reproduction range judging process in an embodiment of the present invention.

Referring to FIG. 1, an image memory 101 stores image signals to be processed. The image signals in general represent densities of three primary color signals such as red (R), green (G) and blue (B). A table 103 stores the measured values of eight primary colors at the output device, and releases the measured data of eight primary colors, corresponding to an output device designated by an output device designation process unit 104, for selecting an output device from plural ones. The above-mentioned measured values of eight primary colors are obtained from R (red), G (green), B (blue), Y (yellow), M (magenta), C (cyan), W (white) and K (black) of highest saturation, produceable by the output device. The measured values of such primary colors, corresponding for example to a hard copying device employing C, M and Y as the three primary colors, are obtained by actual measurement, with a color meter, of the printed colors with the following area rates of R, G, B, C, M, Y, W and K.

The above-mentioned colors R, G, B, C, Y, M, C, W and K correspond to the primary colors and secondary colors of the recording materials of C, M, Y and K employed in the output device.

R: C = 0%, M = 100%, Y = 100%
G: C = 100%, M = 0%, Y = 100%
B: C = 100%, M = 100%, Y = 0%
Y: C = 0%, M = 0%, Y = 100%
M: C = 0%, M = 100%, Y = 0%
C: C = 100%, M = 0%, Y = 0%
W: C = 0%, M = 0%, Y = 0%
K: C = 100%, M = 100%, Y = 100%

Uniform color space conversion process units 102, 105 respectively convert the image signals from the image memory 101 and the measured color data of eight primary colors (hereinafter simply called eight primary color data) from the measured color data table 103 into coordinate values of a same uniform color space. The uniform color space coordinates can be, for example, L*, a*, b* or L*, u*, v* defined by CIE (International Illumination Committee). A plan definition unit 106 defines 12 plane equations by selecting, from eight primary color data converted into the uniform color space coordinates, the coordinates of three colors in predetermined combinations to be explained later. A color reproduction range judgment unit 107 judges whether the object image signal is contained in the color reproduction range of the output device, from the uniform color space coordinates of the object image signal released from the conversion process unit 102 and the 12 plane equations defined by the plane definition unit 106, and accordingly releases a judgment flag 108. Said judgment flag 108, being released for each pixel of the object image, may be stored in another image memory, or may be supplied to a counter, for counting the number of pixels not contained in the color reproduction range.

The storage of the judgment flags in another image memory allows to switch, in simple manner, a process of informing the user of the pixels outside the color reproduction range of the output device and a process of output of the pixels outside the color reproduction range in a normal process.

Also the counting of the number of the pixels outside the color reproduction range enables a process according to the number of such pixels outside the color reproduction range, namely a process responding to the influence, on the image, of the pixels outside the color reproduction range.

In the following there will be explained the method of defining 12 planes in the plane definition unit 106.

Figure 2:
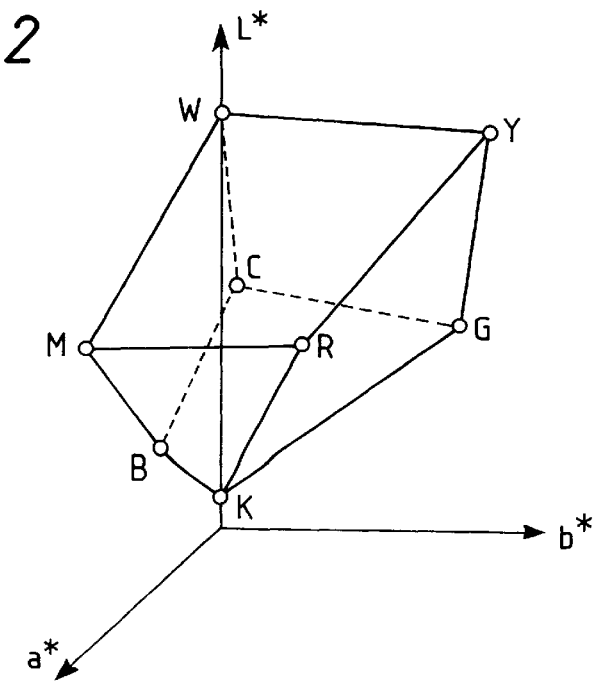
FIG. 2 is a schematic view showing a uniform color space for explaining the color reproduction range.

FIG. 2 is a schematic view, showing the distribution of eight primary color data in the uniform color space. The color reproduction range of the output device can be represented as the interior of an irregular hexahedron having the vertexes at the aforementioned eight primary color data of Y, M, C, G, B, R, W and K as shown in FIG. 2, and any color signal contained in such hexahedron can be reproduced by the output device. It is therefore possible to judge whether an object color signal can be reproduced by the output device, by representing the surfaces of said irregular hexahedron with plural planes and judging whether the object color signal is positioned inside said planes.

As a plane in the three-dimensional space can be defined by designation of three points on said plane, one of the surfaces of the irregular hexahedron can be defined by the definition of a plane by selecting mutually neighboring three of the vertexes of the eight primary color data shown in FIG. 2. For example, a hatched surface can be defined by selecting W, R and Y as the above-mentioned three points. Similarly all the faces covering the entire hexahedron can be defined by defining 12 surfaces by selection of three points in the following 12 manners:

1: W, R, Y
2: W, Y, G
3: W, G, C
4: W, C, B
5: W, B, M
6: W, M, R
7: K, R, Y
8: K, Y, G
9: K, G, C
10: K, C, B
11: K, B, M
12: K, M, R

In the following there will be explained the judging method, utilizing 12 planes defined as explained above.

A plane in the X, Y, Z three-dimensional space can be represented by the following general equation:

$$Ai \cdot X + Bi \cdot Y + Ci \cdot Z + Di = 0$$

wherein Ai, Bi, Ci and Di are coefficients determined according to the manner of plane definition, and are defined for each of the 12 plane definitions mentioned above (i=1–12). X, Y and Z are variables, which correspond, in this case to the uniform color space coordinates L*, a*, b*.

Figure 3:
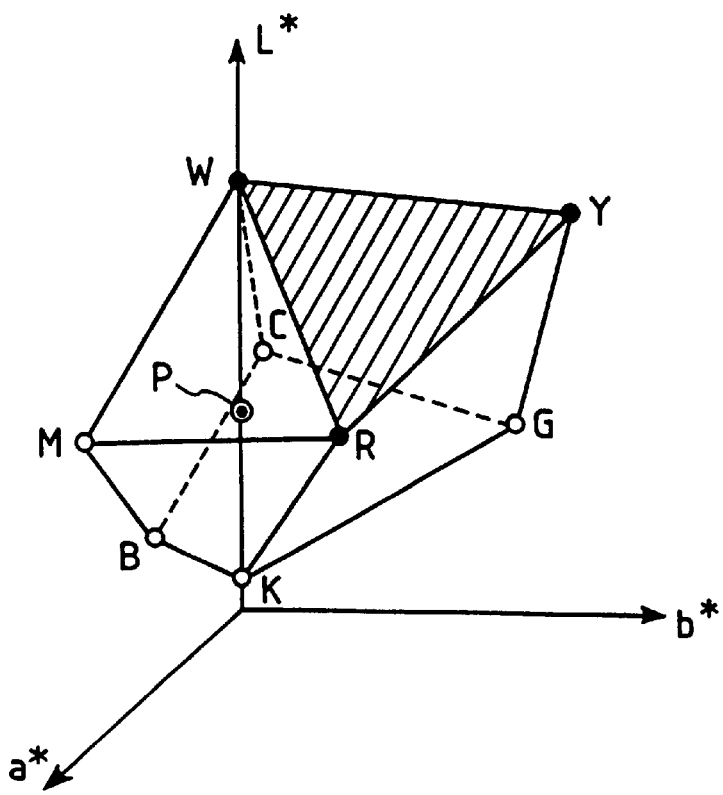
FIG. 3 is a schematic view of a uniform color space for explaining a plane for judging the color reproduction range.

At first a point P (cf. FIG. 3) is selected on the colorless axis (L* axis) in the uniform color space. If a suitable luminocity value (L*) is selected for said point P, such as a colorless point, it will be evident from FIG. 3 that such point P is contained inside the color reproduction range in most output devices. The coordinate of the point P is represented by (L0, a0, b0), while the coordinate Q of the object image signal is represented by (L, a, b). These two coordinate values are substituted in the i-th plane equation to obtain the following two values S1 and S2:

$$S1 = Ai \cdot L0 + Bi \cdot a0 + Ci \cdot b0 + Di$$

$$S2 = Ai \cdot L + Bi \cdot a + Ci \cdot b + Di$$

Figure 4:
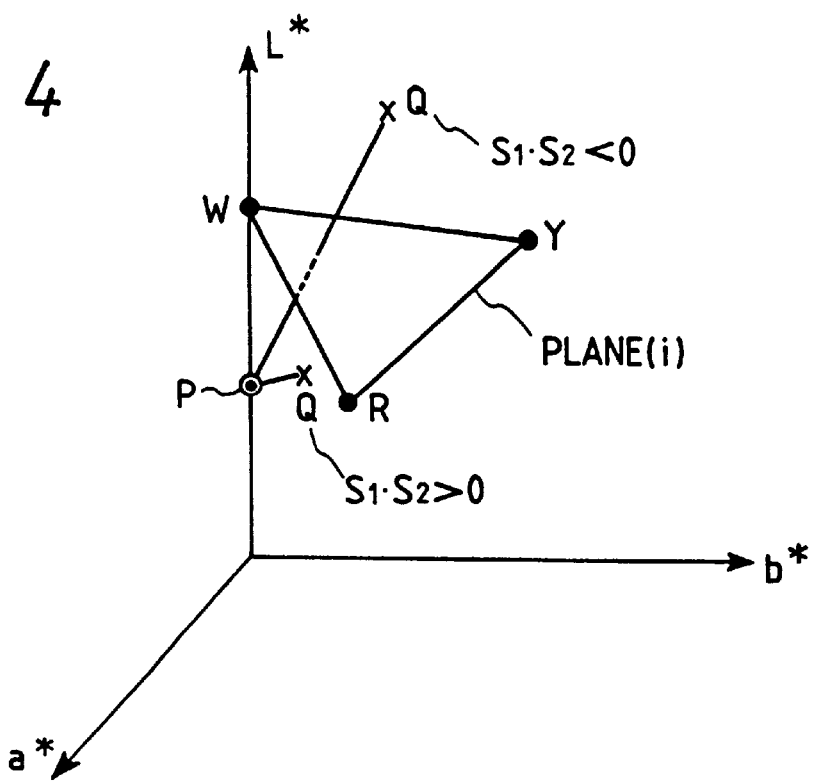
FIG. 4 is a schematic view for explaining the judging method with a plane.

If the object image signal is contained inside the color reproduction range, the coordinate Q (L, a, b) of the object image signal will be positioned at the same side as the point P with respect to the i-th plane, because said point P is contained inside the color reproduction range. Stated differently, the above-mentioned values S1 and S2 should have a same sign (The above-mentioned value becomes zero if the point is present on the plane). On the other hand, if the coordinate Q is positioned outside the color reproduction range, the points P and Q are on the mutually opposite sides across the plane, so that the values S1 and S2 have mutually different sign (cf. FIG. 4).

Thus, whether the object image signal is inside or outside the color reproduction range can be judged, with respect to a plane (i), by the following condition:

inside the reproduction range if: $S1 \cdot S2 \geq 0$ outside the reproduction range if: $S1 \cdot S2 < 0$.

Consequently, the color of the object image signal can be identified to be contained inside the color reproduction range of the output device by effecting the above-mentioned judgment for all the 12 planes, and if the result indicating inside the reproduction range ($S1 \cdot S2 \geq 0$) is obtained for all the 12 planes.

Stated differently, faithful color reproduction based on the object image signal can be achieved with the output device.

On the other hand, the color of the object image signal is not contained in the color reproduction range, if the result indicating outside the color reproduction range ($S1 \cdot S2 < 0$) is obtained for any of the 12 planes.

In such case, faithful color reproduction based on the object image signal cannot be achieved by the output device.

[2nd embodiment]

Figure 5:
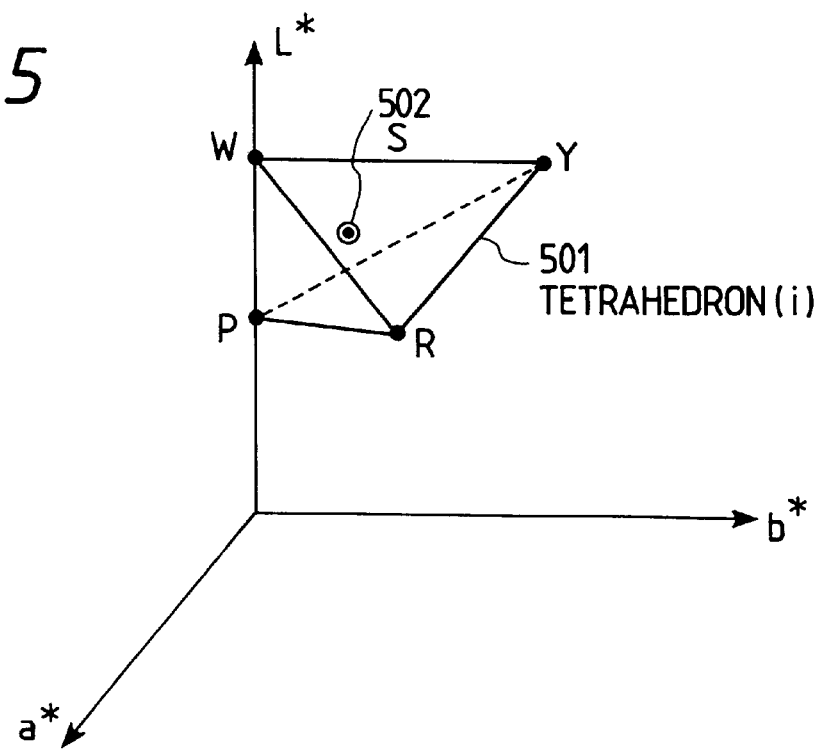
FIG. 5 is a schematic view for explaining the judging method of another embodiment.

FIG. 5 is a schematic view of the uniform color space in another embodiment of the present invention.

In the foregoing embodiment, the color reproduction range of the output device is defined as substantially equivalent to the interior of an irregular hexahedron. In the present embodiment, for achieving a higher precision, the color reproduction range is defined by division into 12 irregular tetrahedrons. More specifically, a tetrahedron 501 is defined, as shown in FIG. 5, by the three points employed in the foregoing 1st embodiment and a point P on the colorless axis, and a center of gravity S (502) is newly defined from the four vertexes (W, R, Y and P in FIG. 5) of the tetrahedron.

Thus a tetrahedron is defined as the interior surrounded by four planes constituted by the following four triangles:

1: $\triangle$WYR
2: $\triangle$WPR
3: $\triangle$WPY
4: $\triangle$PRY

As the center S of gravity is contained in the tetrahedron, it is possible to judge whether the object image signal is contained in a tetrahedron by judging, as in the foregoing first embodiment, whether the coordinate (L, a, b) of the object image signal is positioned at the same side as the center S of gravity with respect to each of the above-mentioned four planes. In the judgments conducted on such tetrahedrons defined for all the 12 planes employed in the foregoing first embodiment, a color signal which is not contained in any of such tetrahedrons can be identified outside the color reproduction range of the output device.

[3rd embodiment]

Figure 6:
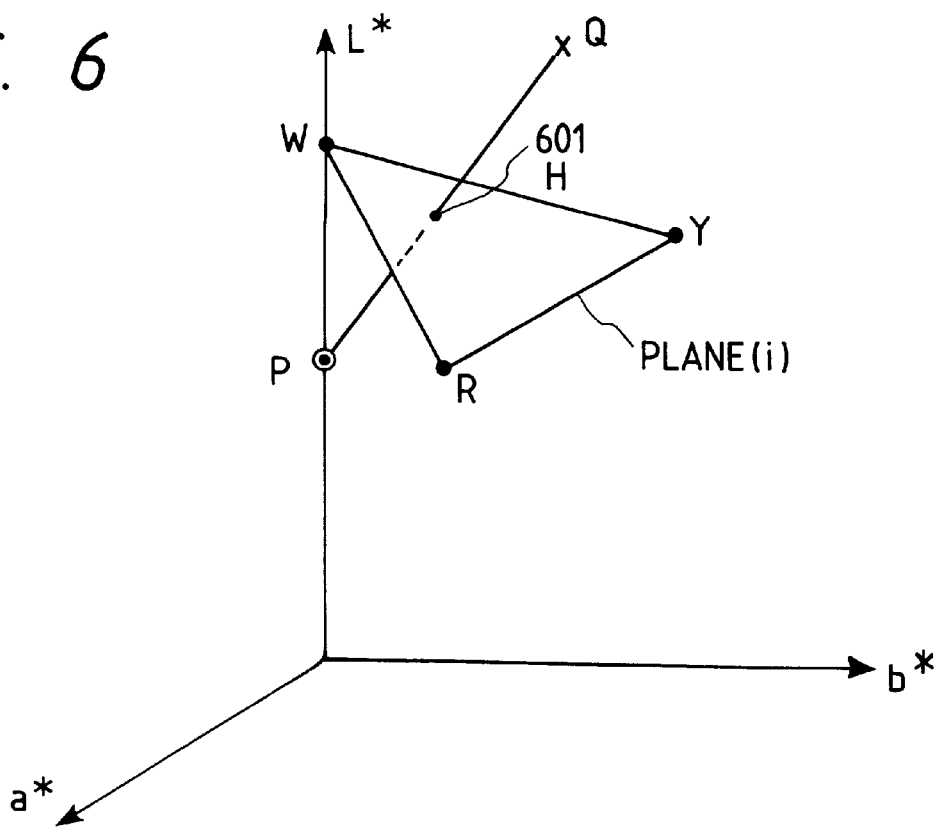
FIG. 6 is a schematic view for explaining the correcting the image signal outside the color reproduction range in still another embodiment.

FIG. 6 is a schematic view showing the uniform color space in still another embodiment of the present invention.

The present embodiemnt judges whether the object image signal is contained in the color reproduction range of the output device, according to the method of the foregoing 1st or 2nd embodiment, and, if not contained, replaces said image signal with a color signal inside the color reproduction range.

Judgment is conducted in the same manner as in the 1st embodiment with respect to the coordinate Q (L, a, b) of the object image signal as shown in FIG. 6, and, if the coordinate Q is identified to be positioned at the opposite side to the point P across an i-th plane ΔWRY, there is determined the coordinate of the crossing point H (601) of the line PQ and said i-th plane. The cross point H has the same hue as that of Q in the uniform color space and is reproduceable by the output device.

The above-mentioned hue is defined by the following equation, utilizing the coordinate values a*, b* of the uniform color space:

hue=arctan (b*/a*)

Thus determined coordinate of the point H is inversely converted into the color signal values (R, G, B) of the input image, and the data in the image memory are accordingly rewritten. When all the pixels are processed in this manner, all the color signals present in the image memory correspond only to the colors contained in the color reproduction range of the output device.

In the foregoing embodiments, the output device is exemplified by a hard copying device or an ink jet printer, for printing on paper or the like, but the output device employable in the present invention can also be, for example, a CRT display or a liquid crystal display. In more general terms, the present invention is applicable to the image signal conversion between devices of different color reproducing abilities.

In the foregoing embodiments, as will be apparent from the associated description, the primary color data determined according to the colors produceable by the output device and the image signal are compared in the same color space, based on the positional relationship between said image signal and an area defined by said primary color data in said color space, and there is judged whether the color of said image signal is produceable by the output device, based on the result of said comparison.

As a result, it is rendered possible, based solely on the primary color data corresponding to the output device, to judge whether the color of the image signal is contained within the color reproduction range, through a simple process.

The above-explained process can be executed either by an exclusive hardware or by a software, and the memory capacity required in such process is reduced in comparison with that required in the conventional process.

[4th embodiment]

In this 4th embodiment, there will be explained, with reference to FIG. 7, a case of suitably varying the parameters, representing the color reproduction range of the printer, according to an instruction from a host computer.

Figure 10:
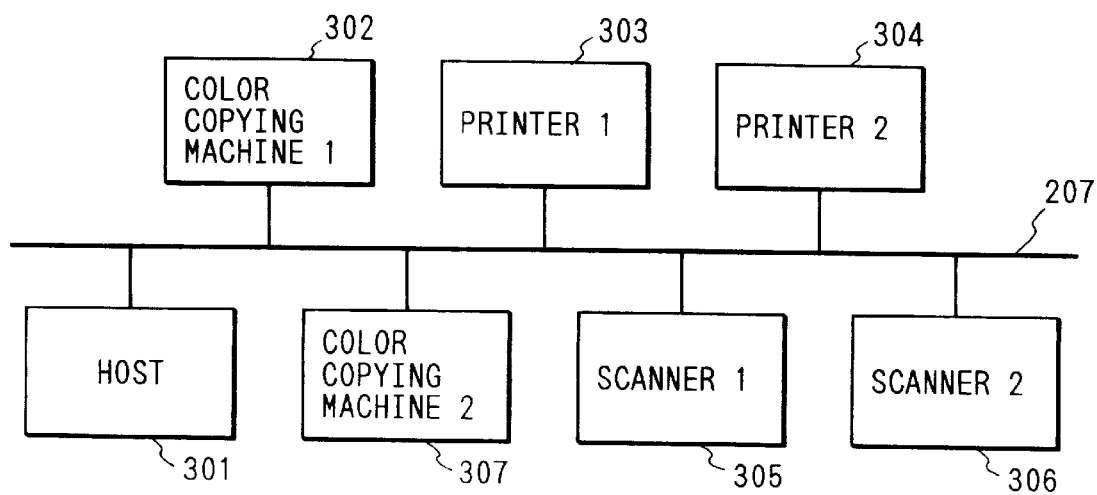
FIG. 10 is a block diagram showing an example of the system configuration.

As shown in FIG. 10, plural color copying apparatus 302, 307 and printers 303, 304 are connected as the print output means of a host computer 301.

Also plural scanners 305, 306 are connected, as input means, to the host computer 301.

Figure 8A:
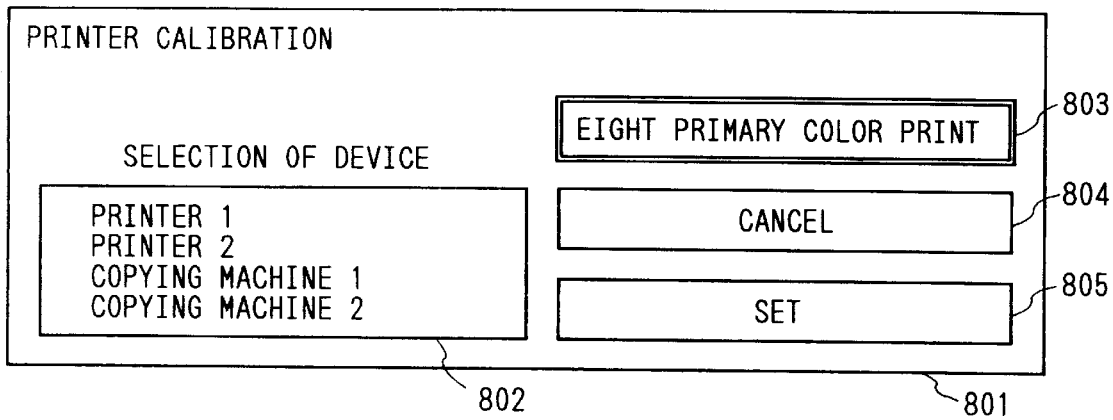
FIGS. 8A and 8B are views showing examples of display at the printer calibration process.

The host computer sequentially executes the process shown in FIG. 7, according to the instructions of the user. At first, in a step 701, a printer calibration mode is selected for renewing the color reproduction parameters of the printer. In response, an image 801 shown in FIG. 8A is displayed on the display monitor of the computer. A desired device is selected from the display 802 of connected plural devices (step 702). Then by clicking a portion 803, for designating the printing of 8 primary colors, with a pointing device such as a mouse, patches of 8 primary colors are released from the designated device, in a form shown in FIG. 9.

Figure 9:
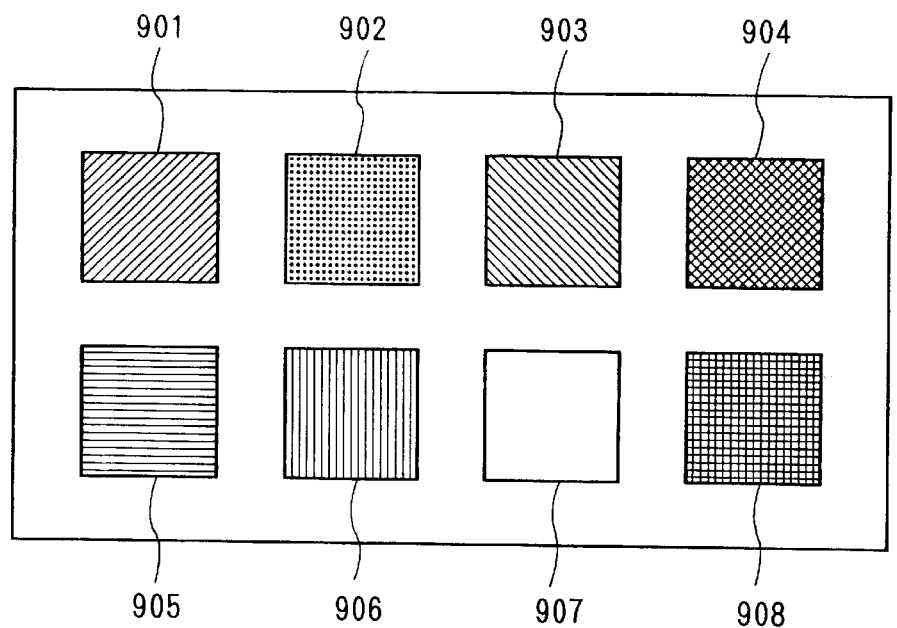
FIG. 9 is a view showing an example of patterns produced by the output device at the printer calibration process.

The 8 primary colors mentioned above are R (red), G (green), B (blue), Y (yellow), M (magenta), C (cyan), W (white) and K (black) of highest saturations produceable by the output device. For example, in case of a hard copying device employing C, M and Y as the three primary colors, the patches shown in FIG. 9 are printed with the following area ratios of C, M and Y:

901 = R: C = 0%, M = 100%, Y = 100%
902 = G: C = 100%, M = 0%, Y = 100%
903 = B: C = 100%, M = 100%, Y = 0%
904 = Y: C = 0%, M = 0%, Y = 100%
905 = M: C = 0%, M = 100%, Y = 0%
906 = C: C = 100%, M = 0%, Y = 0%
907 = W: C = 0%, M = 0%, Y = 0%
908 = K: C = 100%, M = 100%, Y = 100%

Figure 8B:
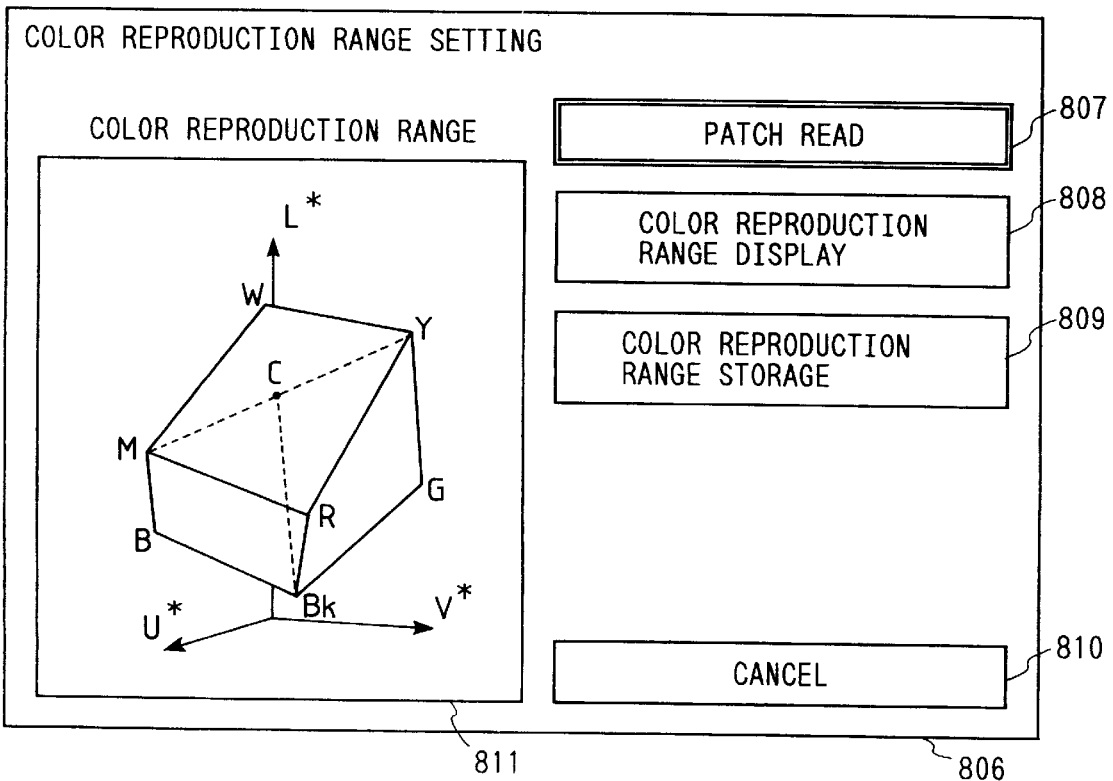

When the patches are printed, a setting button area 805 is clicked, whereby a color reproduction area setting image 806 is displayed as shown in FIG. 8B. The user places the printed patches on the original support table of the copying apparatus, and a patch reading button 807 is clicked. In response the computer sends a reader unit control signal to the copying apparatus, whereby the patches on the original support table are scanned and read (step 704). The computer automatically extracts the patch areas from the read original image, thereby obtaining R, G, B signal values of the 8 primary colors (step 705). The obtained R, G, B signal values are converted, by predetermined conversion equations, into the uniform color space coordinates such as L*, u*, v* (step 706). In the above-explained steps 704 to 706, the reader unit of the copying apparatus is utilized for obtaining the uniform color space coordinates of the 8 primary color patches, but it is naturally possible also to utilize a color meter connected to the computer, or to measure the patches with an off-line color meter and to enter the results of measurement into the computer through a keyboard.

After the above-explained steps, a color reproduction range display button 808 is clicked, whereupon the measured values of the uniform color space coordinates of the 8 primary colors are displayed, together with the coordinate axes, on the color reproduction range display image 811 (step 707). There can be utilized various display methods, such as wireframe display of 12 planes determined by the 8 primary colors, or display of planes colored with the shading method already well known in the computer graphic field.

In the displayed data are satisfactory, a color reproduction range storage button 809 is clicked, whereby the color reproduction range data of the output device are renewed and stored (step 708).

Thereafter the judgment whether the input color image signal is contained in the color reproduction range of the selected output device is conducted by the aforementioned methods, based on thus renewed eight primary color data.

In case of a system as shown in FIG. 10, the color reproduction ranges of the output devices are also an important factor in the selection of the output device. Consequently, at the selection of the output device, the display of the color reproduction range of the selected output device as shown in FIGS. 8A and 8B allows the user to select an output device of an appropriate color reproduction range according to the desired purpose.

More specifically, for example, if the image to be released is rich in yellow image data, there should be selected an output device having a wide color reproduction range in the yellow color.

[5th embodiment]

In the following there will be explained a 5th embodiment of the present invention with reference to the attached drawings. This 5th embodiment is variation of the process of the aforementioned 3rd embodiment for replacing the image signal outside the color reproduction range with a color signal inside the color reproduction range, and the process is varied according to the number of pixels outside the color reproduction range.

Figure 11:
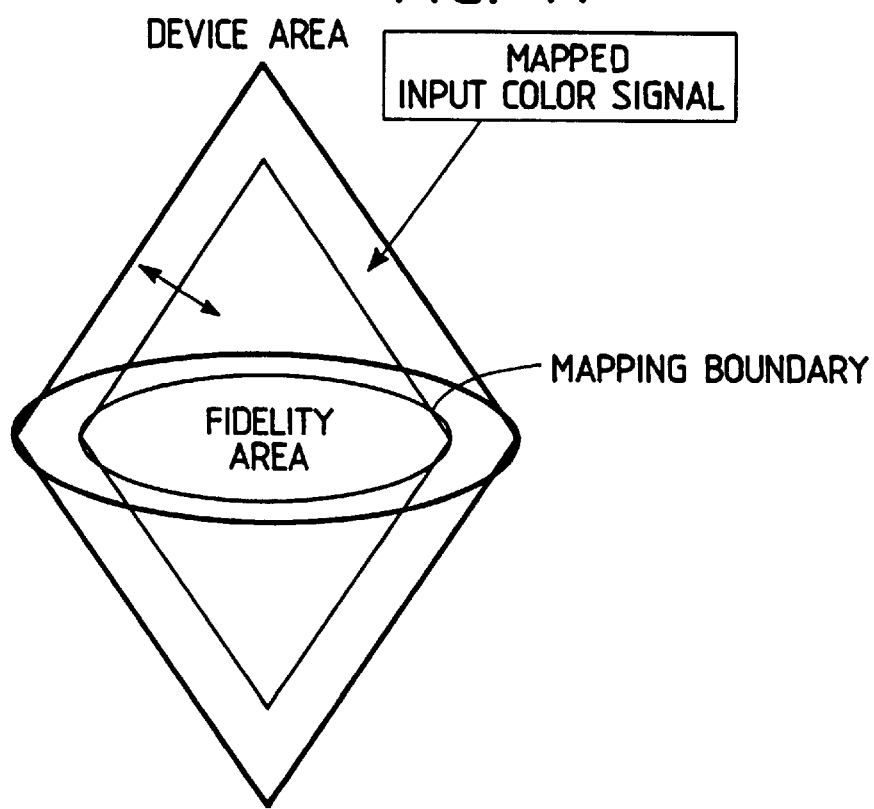
FIG. 11 is a view showing the concept of a fifth embodiment.
Figure 13:
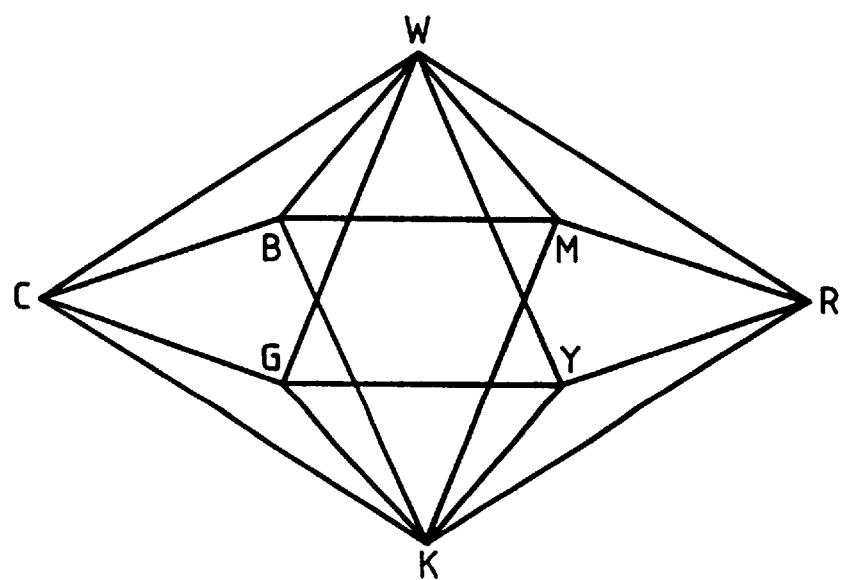
FIG. 13 is a schematic view of the color reproduction area of the output device in the fifth embodiment.

The concept of the present embodiment is shown in FIG. 11, and the process flow of said embodiment is shown in a flow chart in FIG. 12.

FIG. 11 illustrates that a fidelity color reproduction area and a mapping color reproduction area exist in the color reproduction area of the output device, also that a mapping boundary present between the above-mentioned two areas is controlled according to the input image, and that an input color signal outside the mapping boundary is mapped to the mapping color reproduction area.

Referring to FIG. 12, a step 1 enters an image from an image input device such as an image scanner, a video camera, a computer graphic editor or an image file.

Then a step 2 enters data indicating the characteristics of the image output device (hereinafter called profile), such as the image reading characteristics of the image scanner, the device color reproduction area of the monitor, printer etc. and the gamma curve of the monitor.

A step 3 judges, according to the method of the 1st or 2nd embodiment, whether each pixel of the image represented by the color signal entered in the step 1 is positioned inside a certain area of the color space coordinate system.

A step 4 counts the number of pixels, identified in the step 3 as positioned outside the device color reproduction area entered in the step 2, by setting flags as already explained in the 1st embodiment.

A step 5 then determines the position of the mapping boundary, from the ratio of the number of pixels outside the device color reproduction area, as determined in the step 4, to the number of entire pixels.

Then a step 6 determines the mapping coefficient, namely a coefficient for mapping a color signal outside the mapping boundary to the mapping color reproduction area, from the relative position of a pixel having the largest influence at the color space compression among the pixels identified in the step 3 as positioned outside the device color reproduction area, namely a pixel having the largest relative distance to the boundary of the device color reproduction area, and also from the position of the mapping boundary determined in the step 5.

A step 7 judges whether the input color signal is positioned outside the mapping boundary determined in the step 5. Then a step 8 effects mapping of the color signal, identified in the step 7 as positioned outside the mapping boundary, into an area between the mapping boundary and the device color reproduction area, for example by the calculations to be explained later, utilizing the mapping coefficients determined in the step 6.

Finally a step 9 sends the image obtained in the step 7 to an image output device such as a monitor or a printer.

In the following there will be given a more detailed explanation on the processes of the above-mentioned steps, conducted on each pixel of the image entered in the step 1.

(Inside/outside judgment of device color reproduction area)

The step 3 judges whether each pixel of the input color signal is positioned inside the device color reproduction area obtained in the step 2.

In case the device color reproduction area is defined for example by eight points of R (red), G (green), B (blue), Y (yellow), M (magenta), C (cyan), W (white) and K (black), said eight points are converted into the coordinate values of the CIE LAB color space coordinate system, and the device color reproduction area is approximated by a dodecahedron constituted by six points R, G, B, Y, M and C and ridges connecting two points W, K with the above-mentioned six points. Then the color of a pixel is judged as positioned inside or outside the device color reproduction area if the point of the object color signal of said pixel and a point inside said dodecahedron, approximating the device color reproduction area, for example the convergent point, are respectively at the same side or at the opposite sides.

The above-mentioned dodecahedron, representing the device color reproduction area, is equivalent to the irregular hexahedron in the foregoing embodiments.

(Determination of mapping boundary)

The step 4 counts the number of input color signals, identified in the step 3 as positioned outside the device color reproduction area.

Figure 15:
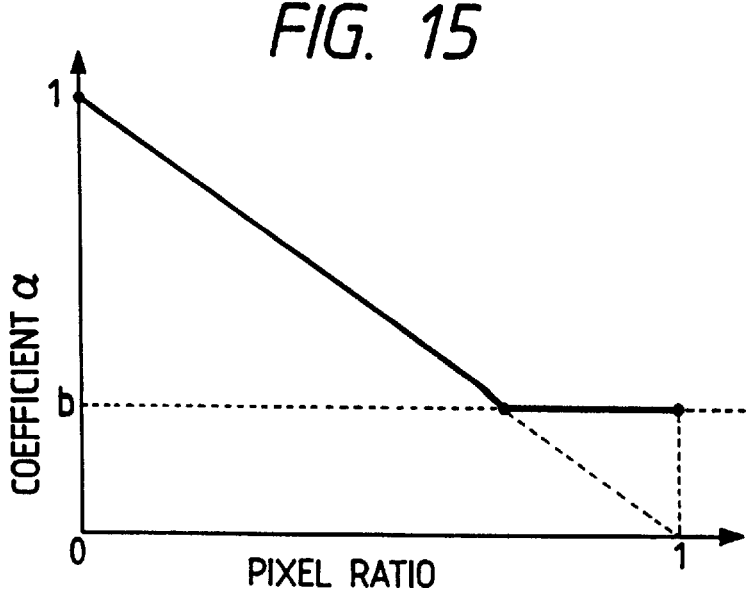
FIG. 15 is a chart showing the relationship between the pixel ratio and the coefficient $\alpha$.

The step 5 calculates the ratio of the number of the input color signals outside the device color reproduction area to the number of the entire input color signals, and control the coefficient $\alpha$, defining the position of the mapping boundary, based on said ratio. The position of the mapping boundary is determined by multiplying the boundary of the device color reproduction area with said coefficient. However, the variable range of the coefficient a is defined, as shown in FIG. 15, by $b \leq \alpha \leq 1$ (b being a predetermined constant), and $\alpha$ is selected at the minimum value b if the value calculated from the ratio of the input color signals outside the device color reproduction area is smaller than b.

As an example, if all the input color signals are present inside the device color reproduction area, the above-mentioned ratio is 0, so that $\alpha=1$. Thus the mapping boundary is so controlled as to become equal to the boundary of the device color reproduction area. On the other hand, in case all the input color signals are present inside the device color reproduction area, the above-mentioned ratio is 1, so that the calculated value of $\alpha$ becomes 0. However, since a is limited within a range $b \leq \alpha \leq 1$ as explained above, a is selected at the possible minimum value b, and the mapping boundary is controlled to a position obtained by contracting the boundary of the device color reproduction area, by the multiplication of b, toward the convergent point.

The above-mentioned convergent point is the convergent point of color space compression, and is, for example, the center of the color space coordinate system.

As explained in the foregoing, as the number of the input color signals outside the device color reproduction area increases, the coefficient a comes closer to b and the mapping boundary approaches the convergent point. Thus the fidelity color reproduction area becomes smaller while the mapping color reproduction area becomes wider, so that the input color signals outside the device color reproduction area can be mapped with maintained continuity in hue. On the other hand, as the number of the input color signals outside the device color reproduction area decreases, the coefficient α comes closer to 0 and the mapping boundary approaches the boundary of the device color reproduction area. Thus the fidelity color reproduction area becomes wider while the mapping color reproduction area becomes smaller, so that most input color signals which are positioned inside the device color reproduction area and can therefore be faithfully reproduced, are released without change.

(Mapping coefficient)

The step 6 determines the mapping coefficient, from the pixels identified in the step 3 as positioned outside the device color reproduction area.

Figure 14:
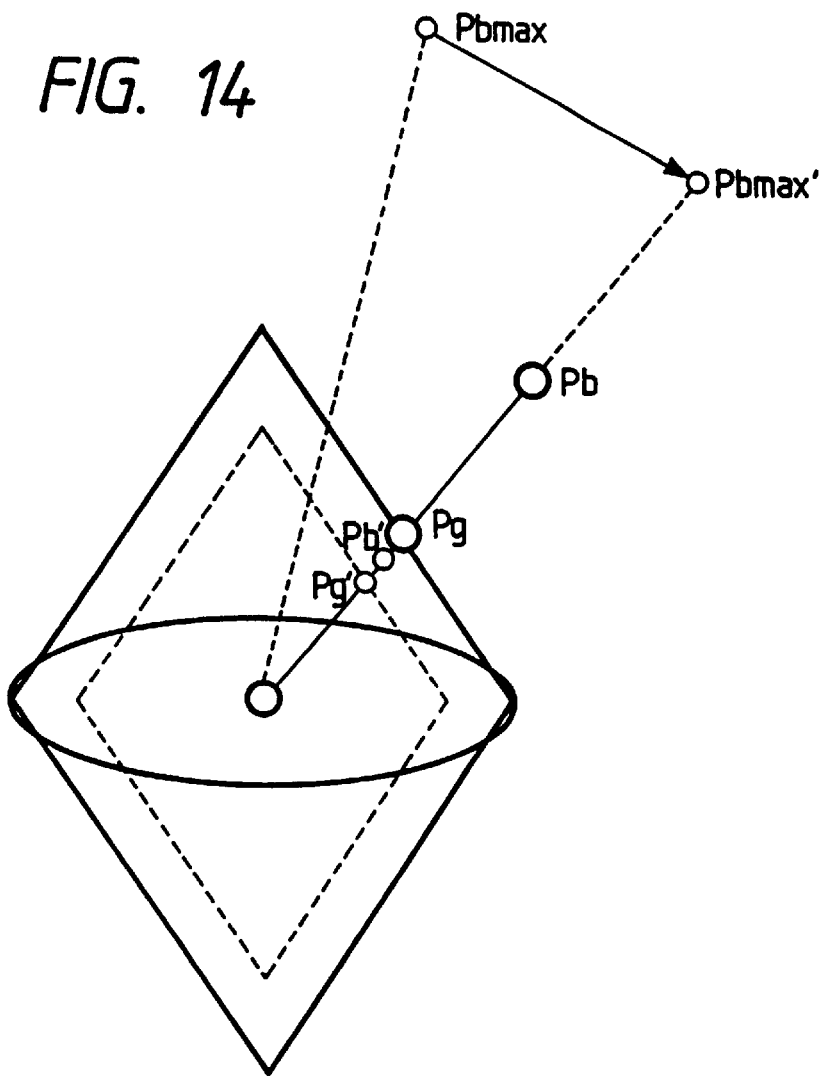
FIG. 14 is a schematic view showing the relative distance in the fifth embodiment.

For example, in case of color space compression along a trajectory connecting a color signal outside the area and the convergent point. The relative position Pr of the color signal is given by:

$$Pr = Pb/Pg \tag{1.1}$$

by defining, as shown in FIG. 14, Pg as the absolute position of the crossing point of said trajectory with the surface of the device color reproduction area; Pg' as the absolute position of the crossing point of said trajectory and the mapping boundary; Pb as the absolute position of the color signal outside the mapping boundary; and Pb' as the absolute position of Pb after color mapping.

Since all the input color signals can be normalized with respect to the device color reproduction area by such calculation based on the relative position, all the input color signals can be compared with $Pbr_{max}$ to be explained later, in the entire color space, and the mapping can be achieved in consideration of the features of the input image.

There are also defined Pgr as the relative position of Pg determined by the equation (1.1); Pgr' as the relative position of Pg'; Pbr as the relative position of Pb; and Pbr' as the relative position of Pb'.

Also the relative position defined by the equation (1.1) is determined for all the color signals outside the device color reproduction area, and the maximum value of such relative positions, or the relative position of the color signal farthest from the device color reproduction area, is represented by $Pbr_{max}$.

In FIG. 14, the absolute position of $Pbr_{max}$ is represented by $Pb_{max}$, and a point $Pb_{max}'$ is defined by transfer of $Pb_{max}$ onto the trajectory between the convergent point and Pb.

The relative position Pbr' of Pbr after mapping is given by:

$$Pbr' = (Pgr - Pgr')/(Pbr_{max} - Pgr') \times (Pbr - Pgr') + Pg' \tag{1.2}$$

wherein Pgr=1 and Pgr'=α according to the equation (1.1).

By dividing both sides of the equation (1.2) with Pgr' in order to take Pgr' as the reference position for representation by relative positions, the relative position Pr' of Pbr' with respect to the mapping boundary Pgr' after the mapping of the color signal Pbr is given by:

$$Pr' = Pbr'/Pgr' = \frac{Pgr/Pgr' - 1}{Pbr_{max}/Pgr' - 1} \times (Pbr/Pgr' - 1) + 1 \tag{1.3}$$

Since Pgr=1 and Pgr'=α according to the equation (1.1), there is obtained:

$$Pr' = A \cdot (Pbr - 1) + 1 \tag{1.4}$$

wherein A is the mapping coefficient which is given by:

$$A = (1/\alpha - 1)/(Pbr_{max}/\alpha - 1) \tag{1.5}$$

The step 6 determined the above-mentioned mapping coefficient from $Pbr_{max}$ and α.

The equation (1.2) requires four variables for each pixel for calculating Pbr', but the transformation into (1.4) enables efficient mapping in the step 8 to be explained later, as the equation (1.4) requires only one variable for each pixel once the mapping coefficient A is calculated.

(Mapping)

In case the input color signal is outside the mapping boundary, the step 8 effects mapping into the mapping color reproduction range by uniform compression according to the equation (1.4).

On the other hand, if the input color signal is inside the mapping boundary, there is not conducted the process for varying the properties of color of the input color signal.

As the mapping boundary is determined in the forementioned step 5, in the process of the steps 6, 7 and 8, the fidelity color reproduction area becomes smaller and the mapping color reproduction area becomes wider with the increase of the input color signals outside the device color reproduction area. Thus the color signals outside the device color reproduction area can be mapped with the continuity in color. On the other hand, with the decrease of the input color signals outside the device color reproduction area, the fidelity color reproduction area becomes wider and the mapping color reproduction area becomes smaller, so that most input color signals, which are inside the device color reproduction area and are faithfully reproducible in color, can be released without change.

Consequently, inside the fidelity color reproduction area, there can be obtained an output image faithful to the input image, and, outside the mapping color reproduction area, there can be obtained an output image which maintains the color balance and the continuity in color.

In the following there will be given an example of the above-explained process, in case the device color reproduction area is defined by eight points of R, G, B, Y, M, C, W and K.

The step 3 judges whether the input color signal is present inside the device color reproduction area entered in the step 2. Then the step 4 counts the number of pixels outside the device color reproduction area and the step 5 determines the ratio of the input color signals outside the area, and determines α from said ratio. Then the step 6 determines the mapping coefficient from α and $Pbr_{max}$.

If the mapping boundary is at a position obtained by contraction by α toward the convergent point, the eight points are contracted by α toward the convergent point in the color space coordinate system. Then, utilizing said eight points, the step 7 judges whether the input color signal is present inside the mapping boundary.

In case of outside of the mapping boundary, the step 8 determines the position after mapping utilizing the distance from the convergent point and the mapping coefficient.

For example, in case the color space compression is conducted along the trajectory connecting the color signal outside the mapping boundary and the convergent point, the crossing point of said trajectory with the mapping boundary, and the relative position is calculated according to the equation (1.1). Then the position after mapping is determined by substituting said relative position into the equation (1.4).

On the other hand, in case of inside of the mapping boundary, there is not conducted the process varying the color properties of the input color signal.

The step 9 releases the image after the color space compression.

[Variation of 5th embodiment]

In the following there will be explained, as a variation to the 5th embodiment, a case of the above-explained image processing method realized with a hardware.

Figure 16:
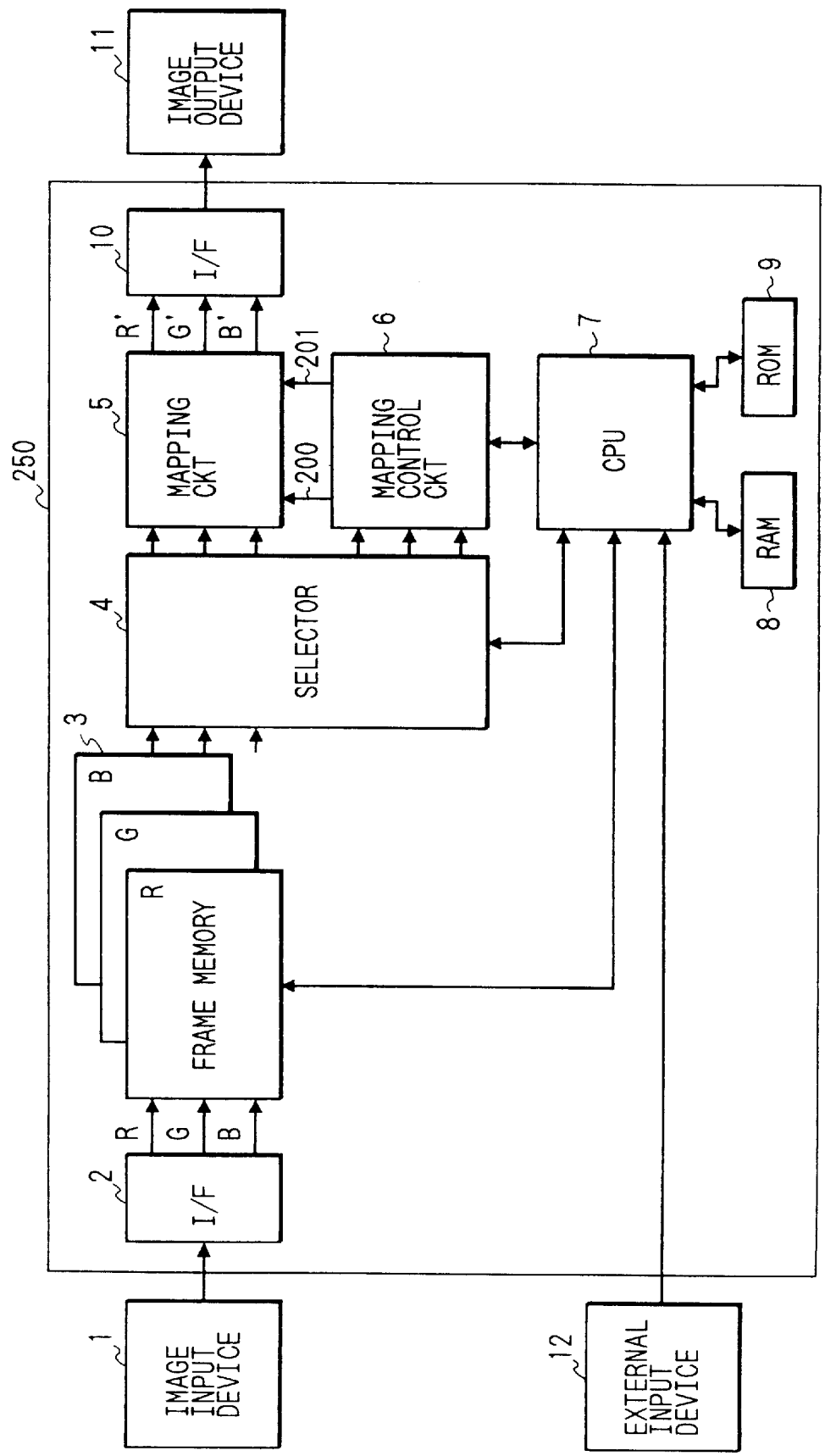
FIG. 16 is a block diagram of the image processing circuit in a variation of the fifth embodiment.

FIG. 16 is a schematic block diagram showing an example of the system for executing the image processing method of the present invention. This system is composed of an image input device 1, an image output device 11, an external input device 12 for entering the profile of the image output device 11, such as the device color reproduction area, gamma curve of the monitor etc., and an image processing device 250.

In the image processing device 250, there are provided an interface 2 for receiving the color signals from the image input device 1; a frame memory 3 for storing the entered color signals of a frame separately in R, G and B; and a selector 4 which sends the R, G, B color signals of a frame, from the frame memory 3, pixel by pixel to a mapping control circuit 6 at first and then sends the color signals of the same frame to a mapping circuit 5. The mapping control circuit 6 executes, based on the image data and the device color reproduction area data from a CPU 7, the judgment of inside or outside of the device color reproduction area, the determination of the mapping boundary and the calculation of the mapping coefficient as explained before, and provides the mapping circuit 5 with the mapping boundary data 200 and the mapping coefficient data 201. On the other hand, the mapping circuit 5 executes the aforementioned mapping based on the mapping boundary data 200 and the mapping coefficient data 201 supplied from the mapping control circuit 6, and releases color signals R', G' and B' after mapping. After releasing all the color signals of a frame to the mapping circuit 5, the frame memory 3 is reset by the CPU 7 and initiates the storage of new color signals. An interface 10 sends the entered color signals R', G' and B' to the image output device 11. The CPU 7 supplies, according to a program stored in a ROM 9, the mapping control circuit 6 with the profile data of the image output device 11, such as the device color reproduction area and the gamma curve of the monitor, supplied from the external input device 12 and stored in a RAM 8, and also controls the frame memory 3, the selector 4 and the mapping control circuit 6.

Figure 17:
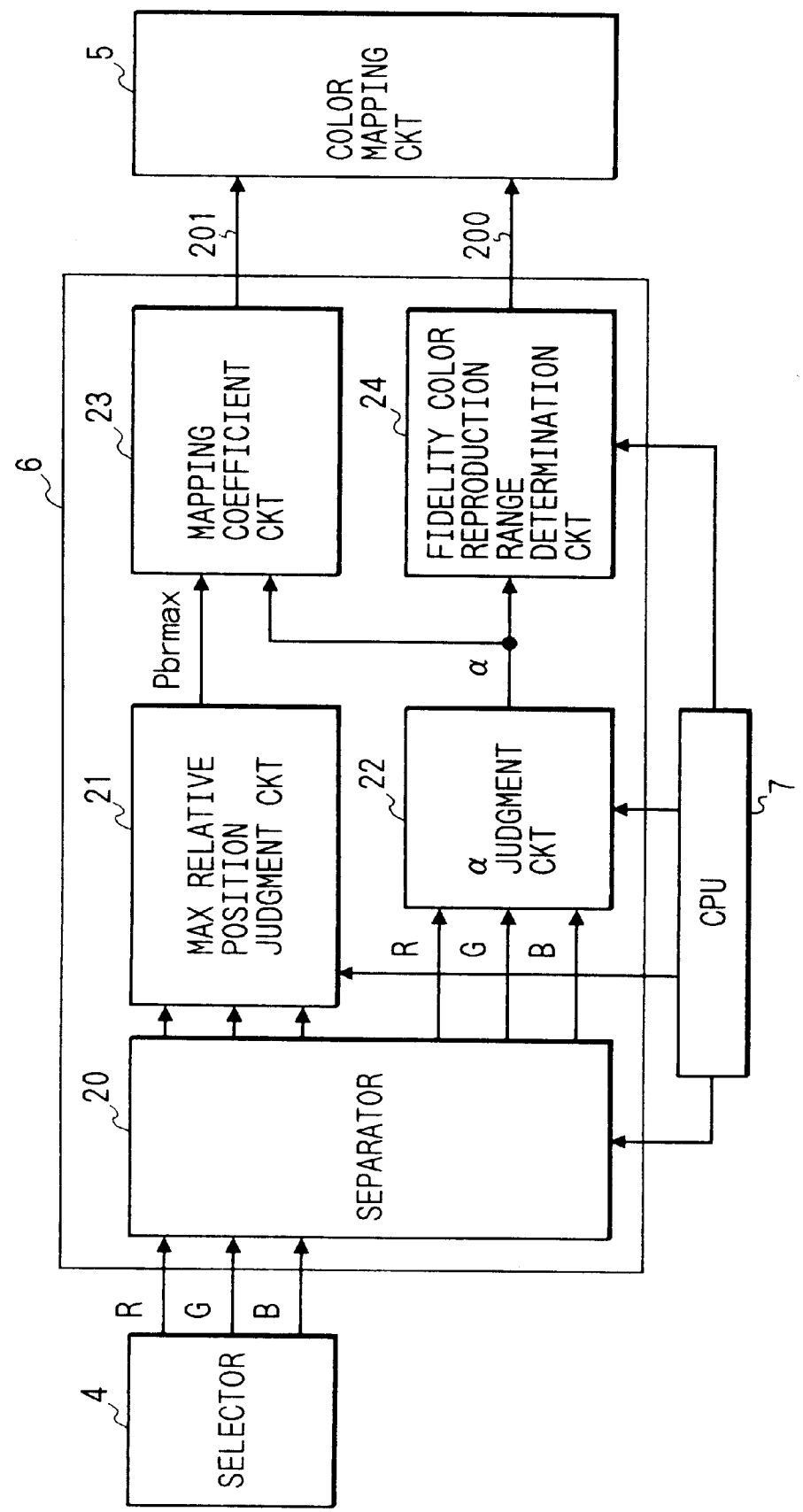
FIG. 17 is a block diagram showing the structure of a mapping control circuit 6 shown in FIG. 16.

FIG. 17 is a block diagram showing the details of the mapping control circuit 6.

A separator 20 sends the color signals, supplied from the selector 4, to a maximum relative position judgment circuit 21 and an α judgment circuit 22. The maximum relative position judgment circuit 21 determines, based on the R, G, B absolute position color signals of each pixel and the device color reproduction area data from the CPU 7, the relative positions of all the pixels with respect to the device color reproduction area and releases the maximum relative position $Pbr_{max}$. On the other hand, the α judgment circuit 22 judges whether the entered color signal is positioned inside or outside the device color reproduction area, based on the count of the number of entered pixels and the device color reproduction area data supplied from the CPU 7, and effects the counting of the number of pixels outside the device color reproduction area, the calculation of the ratio of the number of pixels outside the device color reproduction area to the number of entire pixels, and the calculation of α ($α_{max} \leq α \leq 1$) controlling the mapping boundary, from the above-mentioned ratio. A mapping coefficient circuit 23 effects the calculation of the equation (1.5) for obtaining the color mapping coefficient A, based on $Pbr_{max}$ entered from the judgment circuit 21 and α supplied from the judgment circuit 22, and supplies the color mapping circuit 5 with said mapping coefficient A. A fidelity color reproduction range determination circuit 24 determines fidelity color reproduction area data from the α entered from the judgment circuit 22 and the device color reproduction area data from the CPU 7, and supplies the color mapping circuit 5 with said fidelity color reproduction area data.

Figure 18:
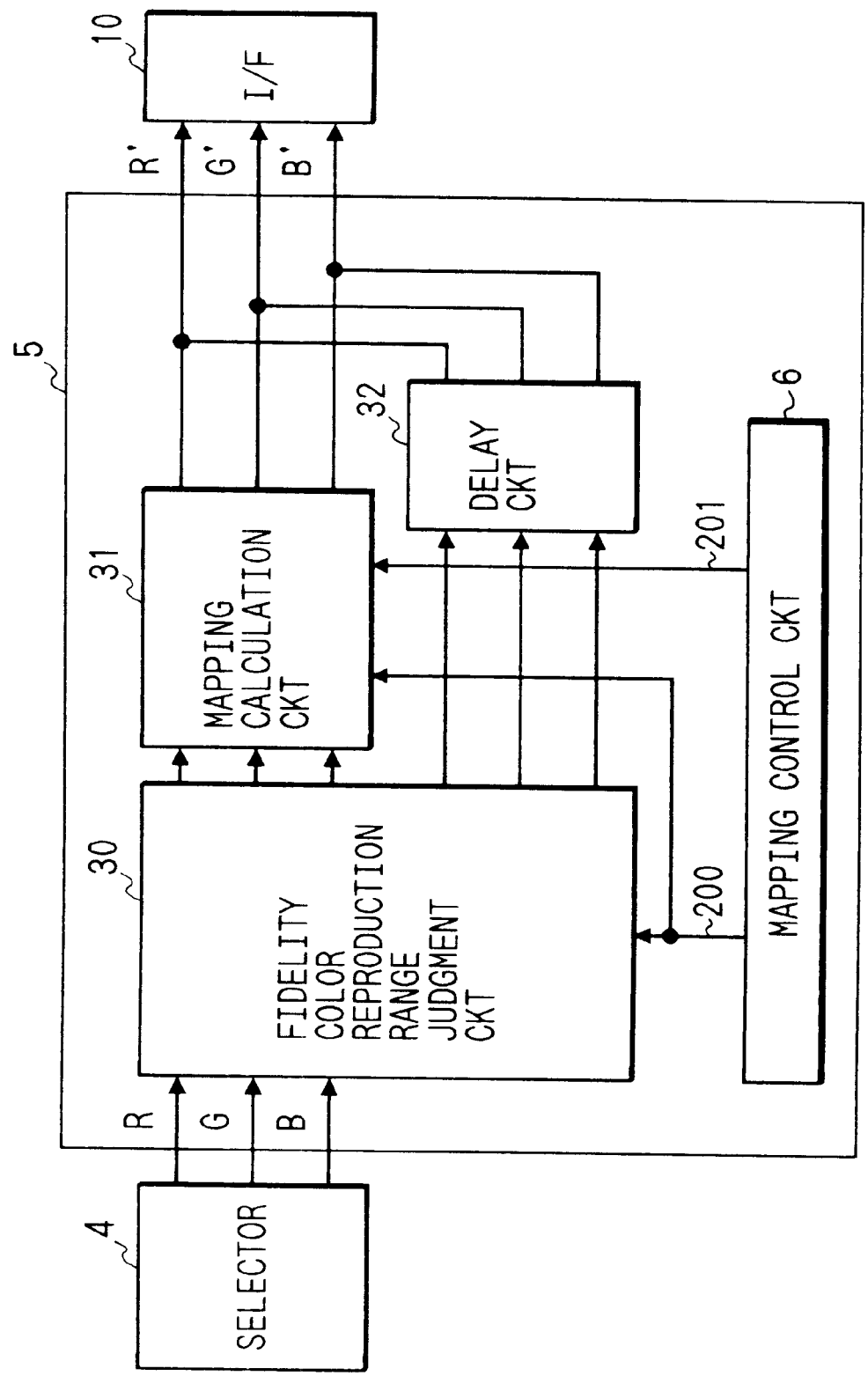
FIG. 18 is a block diagram showing the structure of a mapping circuit 5 shown in FIG. 16.

FIG. 18 is a block diagram showing the details of the mapping circuit 5.

A fidelity color reproduction range judgment circuit 30 judges whether the entered absolute position color signal is positioned inside or outside the fidelity color reproduction area, based on the mapping boundary data 200 from the mapping control circuit 6, and sends said color signal either to the interface 10 if inside the fidelity color reproduction area, or to a mapping calculation circuit 31 if outside said area. The mapping calculation circuit 31 determines, on the absolute position color signal from the judgment circuit 30, the relative position with respect to the fidelity color reproduction area, based on the entered mapping boundary data 200. Then a calculation circuit executing the calculation according to the equation (1.4) determines the relative position P' after mapping, based on said relative position and the entered mapping coefficient data 201, then effects the conversion of absolute position and supplies the interface 10 with pixel data R', G', B' after mapping. A delay circuit 32, composed for example of a line memory, delays the absolute position color signals from the judgment circuit 30 by a time required for the calculation in the mapping calculation circuit 31.

In the following there will be explained, as another variation, the execution of the aforementioned image processing method with another hardware.

Figure 19:
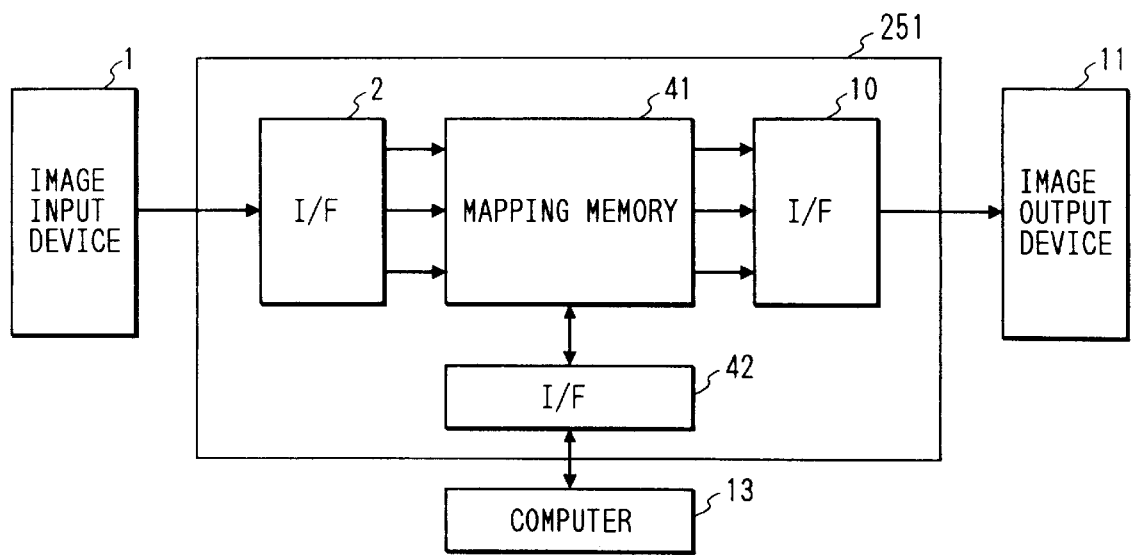
FIG. 19 is a block diagram of the image processing circuit in a variation of the fifth embodiment.

FIG. 19 is a schematic block diagram of a system for executing the color space compression of the present invention. The system of this embodiment is composed of an image input device 1, an image output device 11, an image processing device 251 and a computer 13.

In the image processing device 251, there are provided an interface 2 for receiving the input color signals from the image input device 1; a mapping memory 41, composed for example of a RAM, for releasing the entered input color signals with mapping, based on the mapping data from the interface 42; an interface 10 for sending the input color signals after mapping to the image output device; and an interface 42 for receiving the mapping data from the computer.

The computer 13 determines the mapping boundary based on the device color reproduction area of the image output device 11 and the input color signals from the image input device 1, then prepares the data after mapping corresponding to the input color signals, and forms a look-up table in the mapping memory 14 through the interface 42.

The foregoing embodiments of the present invention employ the L, a, b color space and the R, G, B space of CIE, but there may also be employed, for example, the L, u, v or Y, I, Q color space.

Also the number of pixels outside the device color reproduction area determined in the counting means and the maximum relative position determined in the mapping coefficient determination means in the foregoing embodiments may be obtained by sampling of the input signals, instead of from the entire input color signals.

Also the mapping method is not limited to the linear color space compression as represented by the equation (1.4) but may also be non-linear.

Also the above-mentioned specified value of color signals is not limited to $PBR_{max}$, but can be any value representing the feature of the input image, such as the color signals of the maximum frequency.

Also in the foregoing embodiments of the present invention, the image processing explained above is conducted for the image of a frame, but, if a frame contains plural images of different features such as photograph and text, it is also possible to separate such images into respective areas and to conduct the image processing for each area.

Also the foregoing embodiments enable secure control of the mapping boundary by executing said control according to the number of pixels positioned outside a predetermined color space among the input color signals.

Furthermore there is enabled mapping according to the feature of the input image, by the control of the mapping boundary according to the value of specified input color signals.

As explained in the foregoing, according to the 5th embodiment of the present invention and the variations thereof, a satisfactory color image can be reproduced with maintained continuity of colors even outside the color reproduction area of the image output device, by means of the control of the mapping boundary according to the input color signals.

[6th embodiment]

In the following there will be explained a 6th embodiment of the present invention, which is a variation of the 4th embodiment featured by variation in the parameters representing the color reproduction range of the printer.

The color reproduction range of the image output device is subject to the variation by the ambient conditions and the time-dependent variation.

This embodiment is to vary the parameter representing the color reproduction range, corresponding to the variation of said color reproduction range, thereby effectively utilizing the color reproduction range which can be actually provided by the image output device.

In the following the 6th embodiment of the present invention will be clarified in detail, with reference to the attached drawings.

Figure 20:
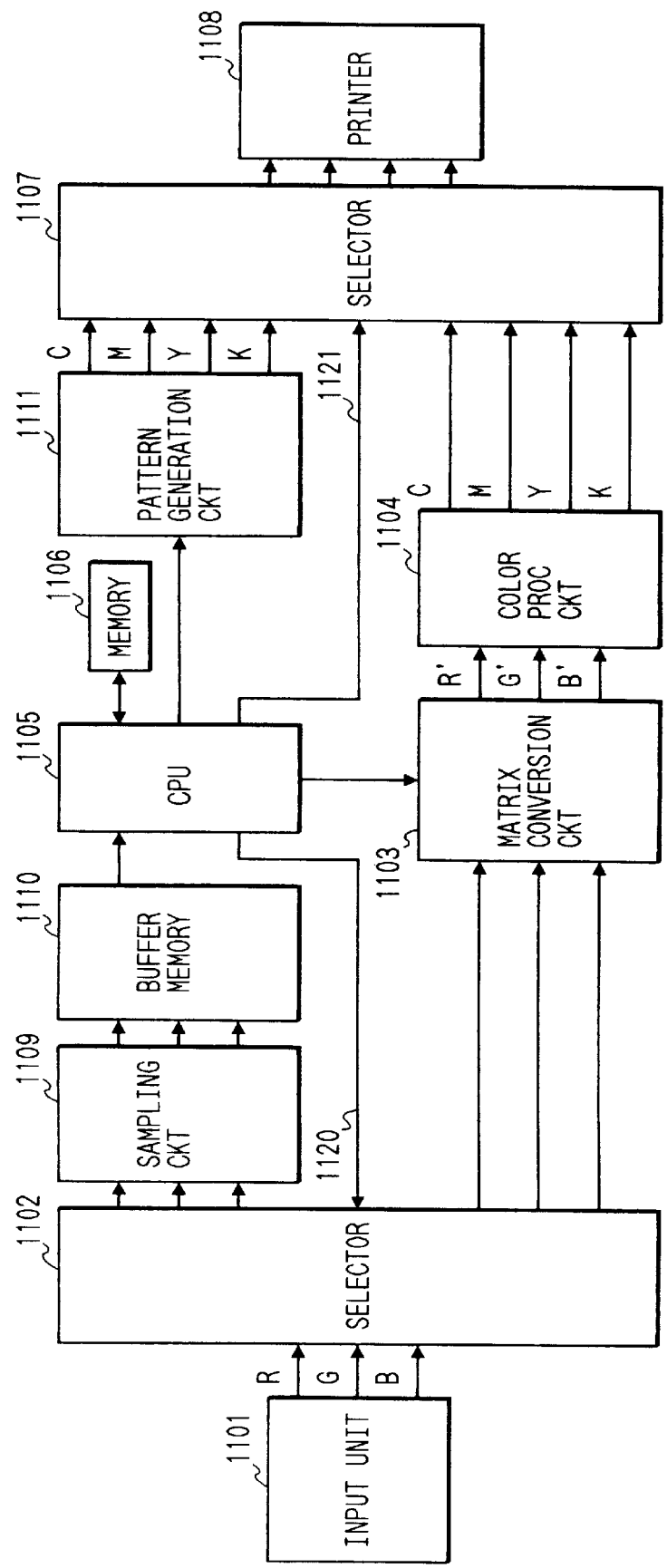
FIG. 20 is a block diagram showing an embodiment of the image processing apparatus of the present invention.

FIG. 20 is a view showing an example of the image processing device of the present embodiment, composed of an input unit 1101 for entering R, G, B signals by scanning an original image; a selector 1102 controlled by a control signal 1120; a selector 1107 controlled likewise by a control signal 112; a printer 1108 for image output; a CPU 1105; a memory 1106 storing image signal representing patches and six primary color representing the color reproduction range; a matrix conversion circuit 1103 for color processing; a color process circuit 1104; a sampling circuit 1109 to be employed in the judgment of the color reproduction range of the printer 1108; a buffer memory 1110; and a pattern generation circuit 1111.

(Ordinary image processing)

In case of ordinary image output, the R, G, B signals entered in the input unit 1101 are supplied through the selector 1102 to the matrix conversion circuit 1103, based on the control signal 1120 from the CPU 1105. The matrix conversion circuit 1103 generates R', G' and B' by the following matrix calculation, utilizing the coefficients set by the CPU 1105 for the input R, G, B signals:

$$\begin{pmatrix} R' \\ G' \\ B' \end{pmatrix} = \begin{pmatrix} R \\ G \\ B \end{pmatrix} + \begin{pmatrix} dR \\ dG \\ dB \end{pmatrix} \quad (2)$$

wherein R, G and B are the original R, G, B signals, and dR, dG and dB are the amounts of compression of the image signals, determined by the following calculation:

$$\begin{pmatrix} dR \\ dG \\ dB \end{pmatrix} = \begin{pmatrix} a11 & a12 & a13 & a14 & a15 & a16 \\ a21 & a22 & a23 & a24 & a25 & a26 \\ a31 & a32 & a33 & a34 & a35 & a36 \end{pmatrix} \times \begin{pmatrix} R-X \\ G-X \\ B-X \\ (R-X)(G-X) \\ (G-X)(B-X) \\ (B-X)(R-X) \end{pmatrix} \quad (3)$$

wherein X represents the minimum value among R, G and B.

In the following there will be explained the method of determination, by the CPU, of the matrix conversion coefficients aij of the equation (3). The object of the matrix conversion is, as illustrated in FIG. 23, to map the originals colors of a wider color reproduction range to the color reproduction range of the printer, thereby achieving color space compression. In the following there will be at first explained the reproduction of red color.

It is assumed that each of R, G and B of the image signals is represented by 8 bits and that the red color of highest saturation in the original image (for example corresponding to a point RG in FIG. 23) corresponds to a color signal of R=200, G=15 and B=0. On the other hand, the red color of highest saturation reproducible on the printer is represented by a point RP, so that all the colors present between the points RP and RG are printed with the color of the point RP.

Inversely, the point RP has the R, G, B color signal values of about R=160, G=20 and B=10. Consequently, by conversion of the input color signals with the matrix conversion circuit in such a manner that R=200, G=15 and B=0 are converted into R'=160, G'=20 and B'=10, the point RG is converted to the point RP and the colors between these two points are mapped to positions inside the point RP. In this manner the color reproduction range of the original image can be mapped to that of the printer, while the primary colors of the input signals are maintained.

By setting such correspondences for all the six primary colors (R, G, B, C, M, Y), there can be obtained 18 simultaneous equations from the equations (2) and (3). These simultaneous equations can be solved unitarily, since they involve 18 matrix conversion coefficients aij of the equation (3).

The above-mentioned image signals R', G', B', subjected to the compression in the matrix conversion circuit 103, are subjected to color processings such as logarithmic conversion, masking, UCR (undercolor removal) etc. in the color processing circuit 1104 and are converted into signals C, M, Y and K. These signals are supplied, according to the control signal 1121 from the CPU 1105, through the selector 1107 to the printer 1108, which in response forms an image.

Thus, as the input image signals are converted into the color reproduction range of the printer 1108 with the preservation of the tonal rendition, the tonal rendition is preserved also for the pixels outside the color reproduction range of the printer 1108 so that there can be obtained an image more faithful to the original image.

Also the color reproduction range can be renewed in simpler manner, by the definition of said range with six points R, G, B, C, M and Y.

(Judgment of color reproduction range of printer)

The C, M, Y and K values representing six primary colors R, G, B, C, M, Y corresponding to the outermost part of the color reproduction range of the printer are stored in advance in the memory 1106, and are read through the CPU 1105 and developed in the pattern generation circuit 1202 into the image signals, which are supplied through the selector 1203 to the printer 1108 for generating patches of the six primary colors R, G, B, C, M and Y. Thus generated patches are read by the input unit 1101 and are supplied through the selector 1102 to the sampling circuit 1109.

The sampling circuit 1109 samples signals in predetermined positions of the patches, constituting the original image, with a predetermined sampling pitch, and stores the obtained signals in the buffer memory 1110. The CPU 1105 in succession reads the image signals stored in the buffer memory 1110, then determines the average value of each patch, further determines the set values of the outermost part of the color reproduction area of the printer and sets these values in the memory 1106.

Consequently, even if the generated patch contains certain unevenness in density, the error from the true value is reduced by the averaging by sampling, so that the color reproduction range can be determined in accurate manner.

In the following there is shown the correspondence between an example of the C, M, Y and K values of the output signals for the patches of six primary colors, stored in advance in the memory 1106 for determining the outermost part of the color reproduction range of the printer, and the R, G, B signal values read by the reader unit. Said R, G, B signal values correspond to the points RP, GP, BP, CP, MP and YP in FIG. 23, at the mapping of the outermost six primary colors of the original image to the color reproduction area of the printer.

the outermost part of the color reproduction range can be easily judged by printing the six primary colors with the maximum density levels obtainable in the printer 1108.

Also if the color reproduction range is different for each device due for example to machine-to-machine fluctuation, difference in the condition of installation or time-dependent variation, there can be set exact color reproduction range corresponding to the state of the engine and the ink of the printer 1108.

It is therefore rendered possible to effectively utilize the color reproduction range actually available for image reproduction, and to effectively utilize the color space compression such as the matrix conversion explained above.

In case the image processing apparatus has a calibrating function for correcting and stabilizing the recording unit, the calibration is conducted at first to correct the recording unit, and then the above-explained judgment of the color reproduction range of the printer is conducted to recognize the portion not corrected by said calibration, thereby rectifying the image processing.

Consequently the image processing can be corrected more exactly by the judgment of the color reproduction range, even in case the calibrating function cannot cover the variation in the color reproduction range resulting from the ambient condition of installation or from the time-dependent variation. Also the judged color reproduction range may be informed to the user as indicated in the 4th embodiment.

|  | C, M, Y, K values of six primary colors | R, G, B, signal values |
|---|---|---|
| RED | C = 0, M = 255, Y = 255, K = 0 → | R = 160, G = 20, B = 10 |
| GREEN | C = 255, M = 0, Y = 255, K = 0 → | R = 10, G = 60, B = 20 |
| BLUE | C = 255, M = 255, Y = 0, K = 0 → | R = 10, G = 0, B = 60 |
| CYAN | C = 255, M = 0, Y = 0, K = 0 → | R = 10, G = 60, B = 160 |
| MAGENTA | C = 0, M = 255, Y = 0, K = 0 → | R = 160, G = 10, B = 80 |
| YELLOW | C = 0, M = 0, Y = 255, K = 0 → | R = 240, G = 240, B = 10 |

Figure 22:
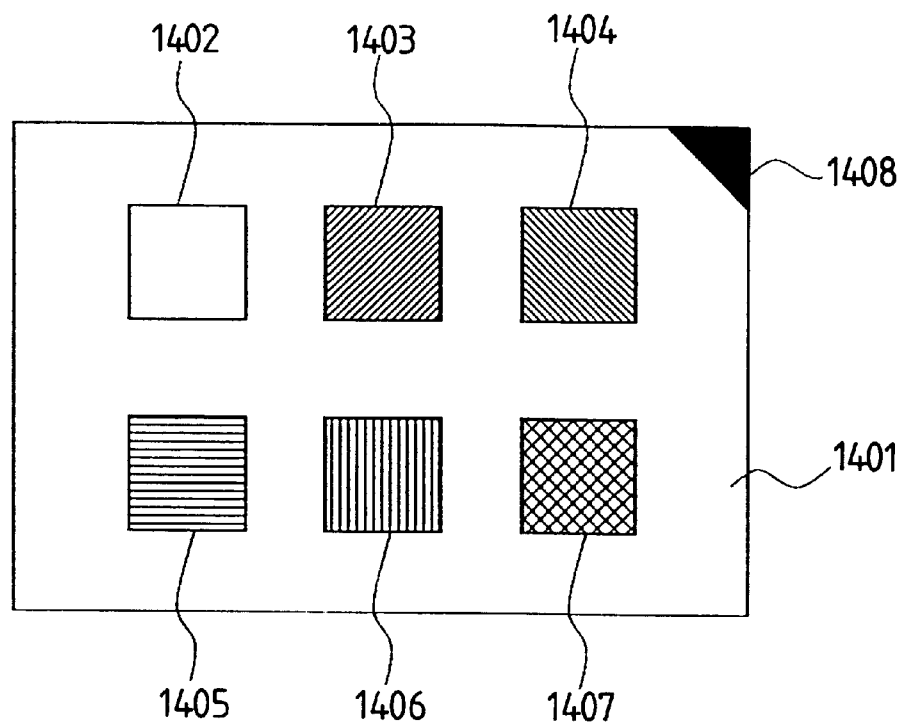
FIG. 22 is a view showing an example of the output patch employed in a sixth embodiment of the present invention.

FIG. 22 shows the patches generated by the printer, corresponding to the six primary colors mentioned above. On an output sheet 401, patches 402–407 of six primary colors (R, G, B, C, M, Y) are generated with the predetermined signal values, at predetermined positions and with a predetermined size. There is also provided a positioning mark 408.

Figure 21:
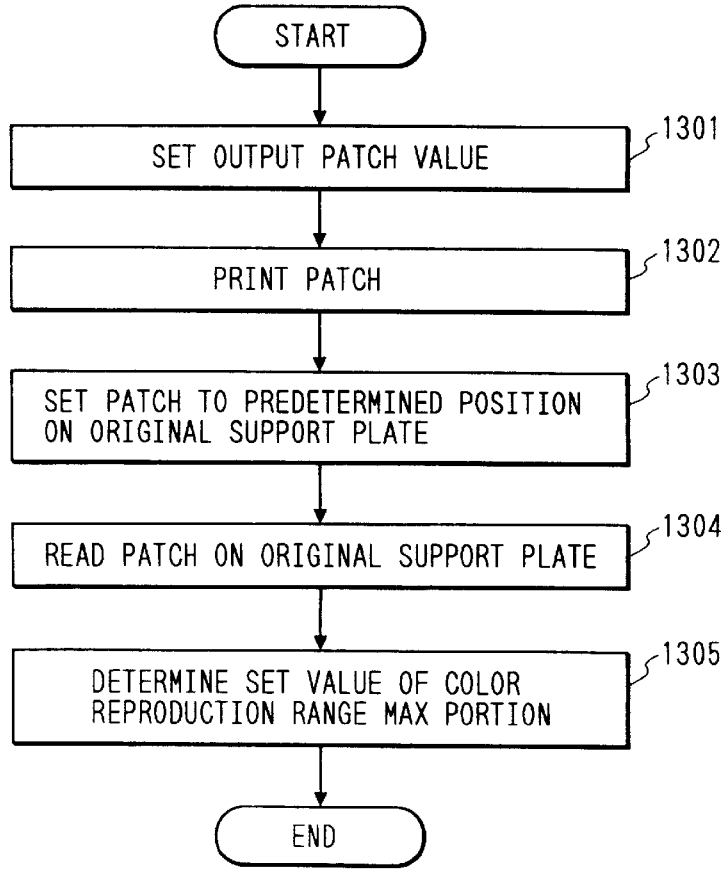
FIG. 21 is a flow chart showing an example of the image processing of the present invention.

In the following there will be explained, with reference to a flow chart shown in FIG. 21, the process flow for judging the color reproduction range of the printer.

A step 1301 sets, in the memory 1106 in advance, the C, M, Y and K values of the six primary colors as indicated by the equation (4), as the values of the output patches. Then a step 1302 causes the pattern generation circuit 1111 to develop image signals based on the set values and the printer 1108 to generate patches as shown in FIG. 22. In a step 1303, the generated patches are placed at a predetermined position on the original support table of the input unit 1101, based on the positioning mark 1408. A step 1304 causes the input unit 1101 to read the patches on the original support table. Then, in a step 1305, the CPU 1105 executes calculation, based on the sampled values of the input R, G, B signals stored in the buffer memory 1110, then judges the outermost part of the color reproduction area of the printer 1108 and sets the values of the six primary colors of the outermost part in the memory 1106.

In case the color reproduction range of the printer 1108 is approximated by the six primary colors as explained above, Variation 1 of the 6th embodiment A variation of the patches in the foregoing embodiment will be explained with refernece to the attached drawings.

Figure 24:
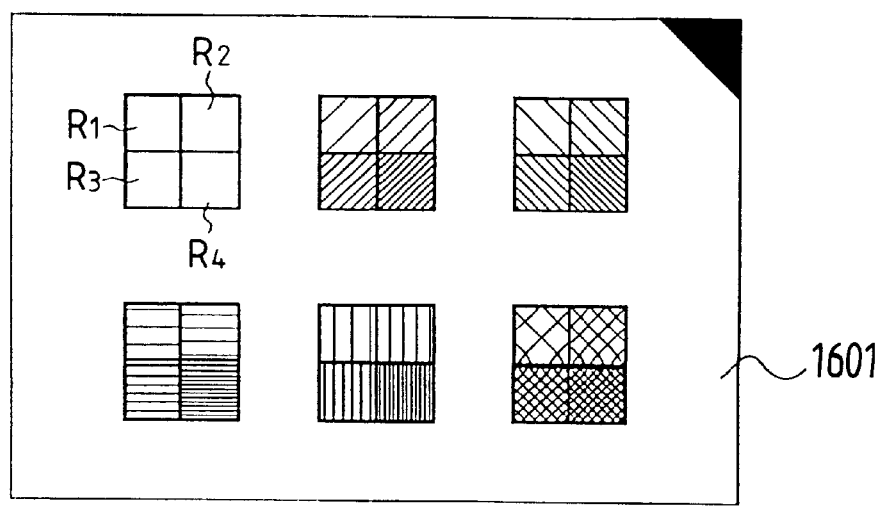
FIG. 24 is a view showing an example of the output patch employed in a variation 1 of the sixth embodiment of the present invention.

In this embodiment, for detecting the color reproduction range of the printer with improved accuracy, plural patches are generated for each of the six primary colors as shown in FIG. 24 and read to detect the outermost part, thereby setting the color reproduction area of the printer.

FIG. 25 is a flow chart showing the control sequence.

FIG. 24 shows, as an example a case of generating four patches for each of the six primary colors. Although there are employed four patches for the purpose of simplicity of explanation, the present invention is naturally not limited to such number. There can be employed plural patches of any number, and the accuracy is naturally improved as the number of patches increases.

At first a step 1701 sets the C, M, Y and K values of each patch in advance, and a step 1702 causes the image output device to generate the patches with the set values. A step 1703 sets the generated patches on the image reader unit, and a step 1704 reads the R, G and B signal values. Then a step 1705 detects the outermost patch, among four patches of each primary color, by a method to be explained later, and a step 1706 determines the R, G, and B signals values of the detected patch as the outermost part of the color reproduction range.

Figure 26:
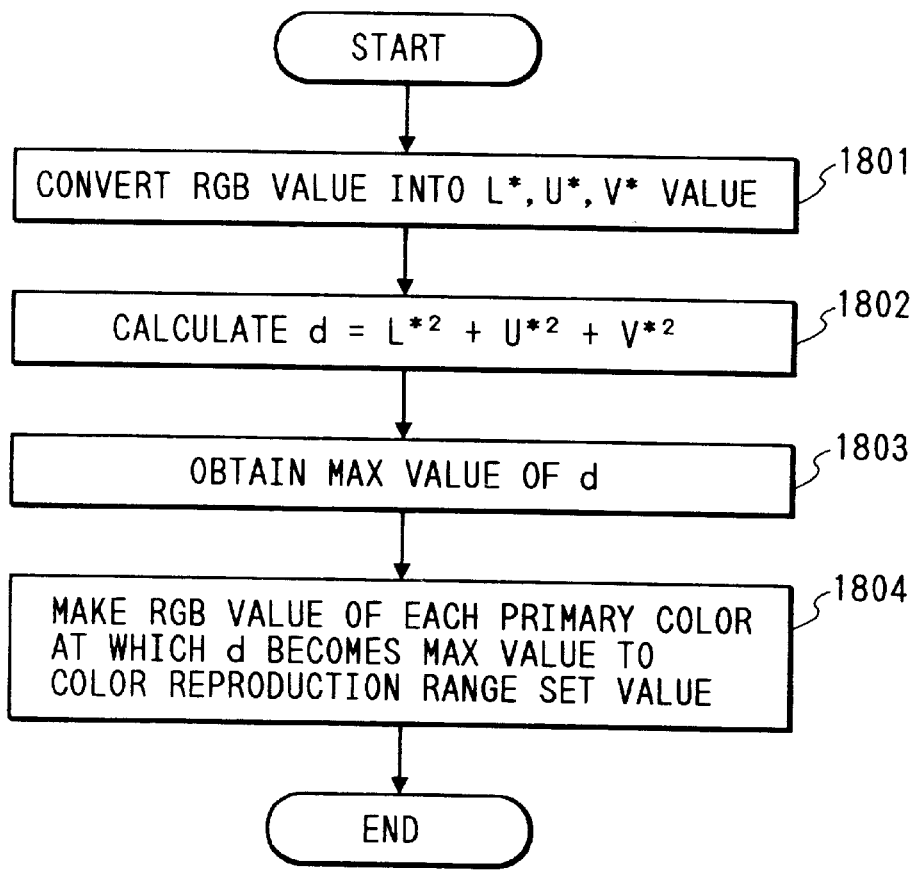
FIG. 26 is a flow chart showing an example of the image processing for detecting the outermost part of the color reproduction range.

In the following there will be explained the method of detecting the outermost patch among those of each primary color, with reference to FIG. 26.

At first, for effecting the detection in the uniform color space, a step 1801 converts the R, G and B signals of each primary color into L*, u* and v*. This conversion can be achieved by the following equations:

$L^*=116(Y/Y0)^{1/3}-16$ $u^*=13L^*(u-u0)$ $v^*=13L^*(v-v0)$ wherein $u=4X/(X+15Y+3Z)$ $v=9Y/(X+15Y+3Z)$.

Figure 27:
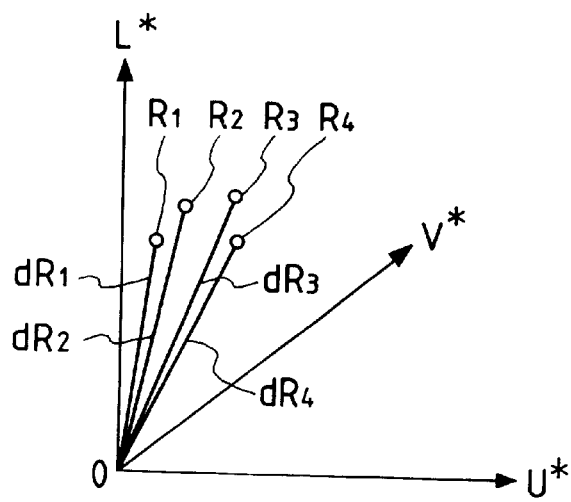
FIG. 27 is a view showing an example of the method for detecting the outermost part of the color reproduction range.

Also $X=0.6067R+0.1736G+0.2001B$ $Y=0.2988R+0.5868G+0.1144B$ $Z=0.0000R+0.0661G+1.1150B$ For the purpose of simplicity, there will be given an explanation on the red color only. FIG. 27 shows the L*, u* and v* values of four patches.

As the color is positioned at the outer side of the color reproduction area as the distance from the center 0 increases, a step 1802 determines the distance d from the center, by the following equation:

$$d=L^{*2}+u^{*2}+v^{*2} \qquad (5)$$

Also the following equation may be employed instead, in order to simplify the calculation:

$$d=u^{*2}+v^{*2} \qquad (6)$$

Then a step 1803 determines the maximum value of d.

In FIG. 27, dR3 is largest, so that the point R3 indicates the red color with highest saturation.

Thus a step 1804 sets the R, G, B signals, obtained by reading the point R3, as the outermost part of the red color reproduction area. Similar processes are conducted also for other five colors, and there are determined the maximum values of the color reproduction areas of six primary colors.

In the foregoing explanation, the L*, u*, v* space is employed for detecting the outermost part of the color space, but there may also be employed other color spaces such as L*, a*, b* or Y, I, Q space for this purpose.

In this manner, the use of plural patches allows to exactly recognize the outermost part of the color reproduction range even if certain aberration is involved in the luminocity, hue and saturation.

[Variation 2 of the 6th embodiment]

The foregoing embodiment has employed six primary colors R, G, B, C, M and Y, but it may also be expanded to eight primary colors, including white (W) and black (K), as in the 4th embodiment.

In the following there will be explained a case employing eight primary colors.

At first there will be given an explanation on black color. The maximum reproduction area of black corresponds to the maximum density of black. In the following there is shown an example of the output signal values of the black patch and of the R, G, B signal values read by the reader unit, for determining the outermost part of the color reproduction range of the printer:

C=145, M=145, Y=145, K=255 →R=4, G=4, B=4

As the patch of maximum density of black has a read value of 4, a signal value less than 4 is not reproduced. However, with the method explained with six primary colors, it becomes possible to reproduce the density level less than 4, for example a minimum read value of 1 for black in the original, by employing an equation (7) so modified as to convert 1 to 4.

As regards white, maximum white is obtained in an unprinted portion, so that C, M, Y and K of the printer output values have to become zero. Since such zero output values are obtained from the printer when the read R, G, B signal values are 255 (maximum value of the read signal values), such signal level of 255 has to be provided forcedly.

In order to confirm that no color outputs are provided when the printer output values C, M, Y, K are zero, a white patch is generated (printer output values C, M, Y, K=0) then is read in the reader unit and compared with the background level of the recording sheet outside said patch. In this manner the absence of background smudge and the normal operating condition of the printer are confirmed.

Figure 30:
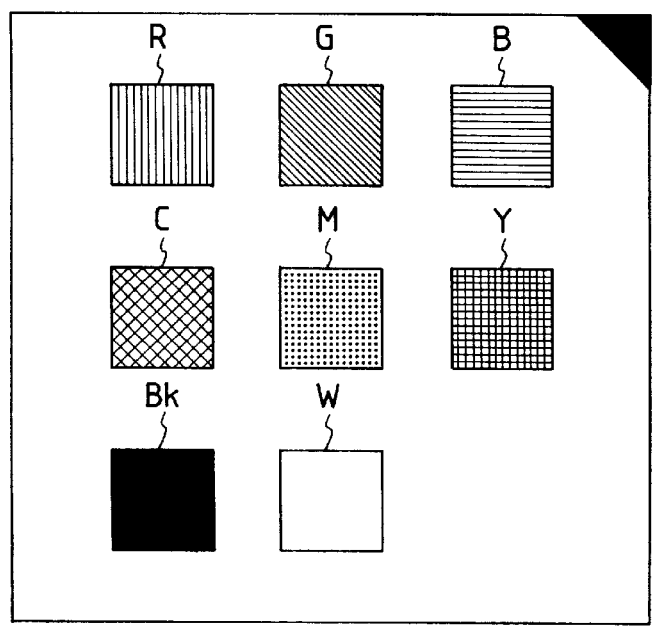
FIG. 30 is a view showing an example of the output patch employed in a variation 2 of the sixth embodiment of the present invention.

In FIG. 30 there is illustrated an example of the patches, including white and black colors, for determining the outermost part of the color reproduction range of the printer.

$$\begin{pmatrix} R' \\ G' \\ B' \end{pmatrix} = \begin{pmatrix} R \\ G \\ B \end{pmatrix} + \begin{pmatrix} dR \\ dG \\ dB \end{pmatrix} \qquad (17)$$

$$\begin{pmatrix} dR \\ dG \\ dB \end{pmatrix} = \begin{pmatrix} a11 & a12 & a13 & a14 & a15 & a16 & a17 & a18 \\ a21 & a22 & a23 & a24 & a25 & a26 & a27 & a28 \\ a31 & a32 & a33 & a34 & a35 & a36 & a37 & a38 \end{pmatrix} \times$$

$$\begin{pmatrix} R-X \\ G-X \\ B-X \\ (R-X)(G-X) \\ (G-X)(B-X) \\ (B-X)(R-X) \\ R*G*B \\ (255-R)(255-G)(255-B) \end{pmatrix}$$

wherein R, G and B are original image signals, and dR, dG and dB indicate amounts of compression of the image signals.

[7th embodiment]

This embodiment is to respond to the difference in the color reproduction range, depending on the process mode.

Figure 28:
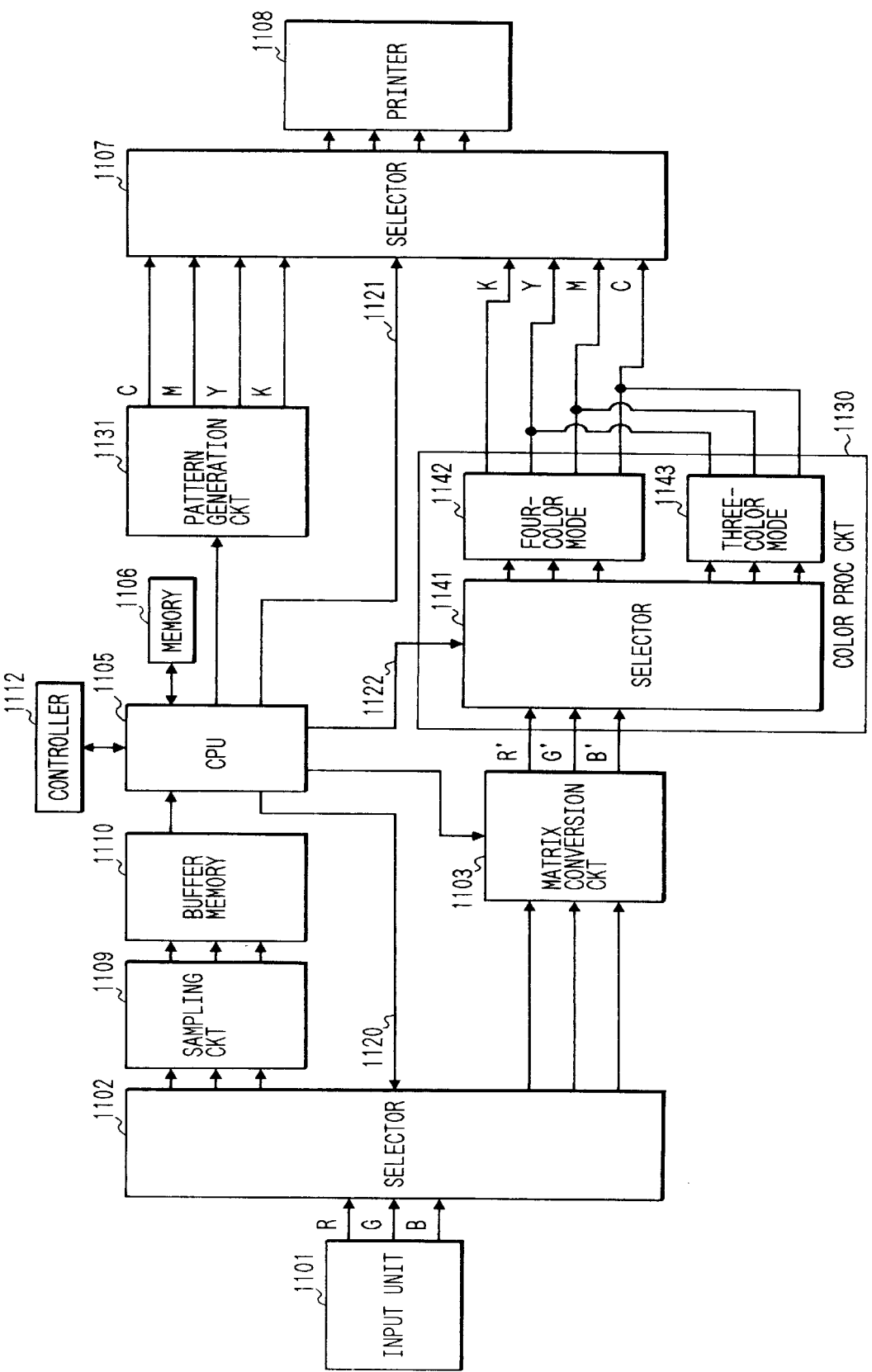
FIG. 28 is a block diagram of a variation of the image processing apparatus of the present invention.

This 7th embodiment will be clarified in detail with reference to FIG. 28, in which same components as those in the 6th embodiment are represented by same numbers and will not be explained further.

Referring to FIG. 28, a controller 1112 provides the CPU 1105 with an instruction for selecting either a four-color mode or a three-color mode. The color process circuit 1130 effects the color processing, such as masking, of the R',G', B' signals entered from the matrix circuit 1103, either in the four-color mode 1142 or in the three-color mode 1143, by shifting a selector 1141 according to a control signal 1122 from the CPU 1105. The four-color mode is to convert the entered R', G', B' signals into the C, M, Y, K signals, while the three-color mode is to convert said entered signals into the C, M, Y signals. In the ordinary image processing, an image is formed in the printer 1108, based on the C, M, Y, K signals (four-color mode) or the C, M, Y signals (three-color mode) released from the color process circuit 1130.

The controller 1112 provides the CPU 1105 with an instruction for selecting either the four-color mode or the three-color mode.

Since the number of inks used is different in the four-color mode and in the three-color mode, the color reproduction range of the printer 1108 is also different.

Therefore, image data for generating the patches for the four-color mode and for the three-color mode are stored in advance in the memory 1106, and are converted into the image data for patch generation in each mode, in the pattern generation circuit. More specifically, the C, M, Y, K signals or the C, M, Y signals are released respectively in the four-color or three-color mode, thereby causing the printer 1108 to generate patches as in the foregoing embodiment. The generated patches are read in the input unit 1101 for judging the outermost part of the color reproduction range, which is stored in the memory 1106, in correspondence with the respective operating mode.

The ordinary image processing is conducted with the color reproduction range stored in the memory 1106 corresponding to the selected mode.

As this embodiment considers not only the difference in the color reproduction range among different units of the apparatus but also the difference in the color reproduction range depending on the selected mode, resulting for example from the number of inks used, there can be achieved effective utilization of the color reproduction range in each mode and of the color space compression such as the matrix conversion.

It is therefore rendered possible to fully exploit the feature of each mode, and to provide the image desired by the user.

The present invention is not limited to the case of using the four-color and three-color modes, but it is also possible to store the data representing the color reproduction range for each of the modes having different color reproduction range in the image output device, for example the modes different in the UCR amount, the printing method or the recording material such as overhead projector sheet or paper.

It is also possible, instead of responding to each of the modes, to divide these modes into groups and to store the data of the color reproduction range for each group.

It is furthermore possible, as explained in the 4th embodiment, to display the color reproduction range corresponding to each mode.

[8th embodiment]

In the following there will be explained, with reference to FIG. 29, an 8th embodiment of the present invention in which the foregoing embodiment is applied to a system composed of plural equipment.

Figure 29:
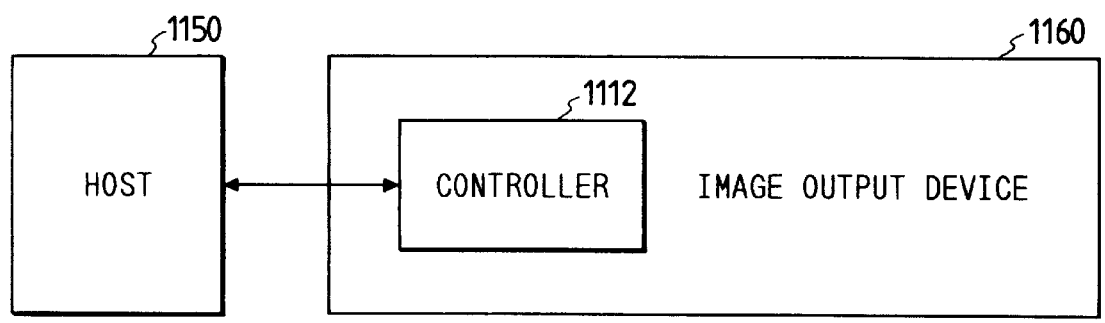
FIG. 29 is a block diagram of a systemized embodiment of the present invention.

In FIG. 29, an image output device 1160 is composed for example of a laser beam printer, an ink jet printer, or an IPU and a CLC, which have the structure as explained before. A host equipment 1150 effects image processing such as image editing, color conversion and color correction, and sends the data to the image output device 1160 for image output.

The image processing in the host equipment 1150 has to be conducted in consideration of the color reproduction range of the image output device 1160, and, for this reason, the host equipment 1150 stores, in advance, the color reproduction range of the image output device 1160.

In case the data representing the color reproduction range of the image output device 1160 are renewed as in the foregoing embodiments, such data are transferred from the memory 1106 to the controller 1112 through the CPU 1105, and are transmitted from said controller 1112 to the external host equipment 1150. In response the host equipment 1150 renews, based on the received data, the data representing the color reproduction range in the profile of corresponding output device 1160.

The data transfer from the image output device 1160 to the host equipment 1150 is conducted at the renewal of the data of the color reproduction range in the image output device 1160 or at the request from the host equipment 1150.

Consequently the profile concerning the color reproduction range of the image output device 1160 can be maintained in the host equipment 1150 always in the correct form, and the host equipment 1150 can execute the image processing, fully utilizing the color reproduction range.

Also since the renewed data are transferred from the image output device 1160, there is not required the rewriting of the profile in the host equipment 1150, by the manipulation of the user, for example through the input device such as a keyboard.

In the foregoing there has been explained a system composed of a host equipment and an image output device, as an example of the application to the system composed of plural equipment, but the present invention is not limited to such application and is also applicable, for example, to a system in which a host equipment is combined with plural input devices and image output devices.

Also the image processing utilizing the color reproduction range in the present invention is not limited to the matrix conversion but can be, for example, a process of color space compression utilizing a look-up table prepared with the color reproduction range, or a process of judging whether the input image data are within the color reproduction range.

Also the present invention is naturally applicable to a case in which the present invention is achieved by the supply of a program to a system or an apparatus.

Also the image output device is not limited to those explained in the foregoing, but may employ a recording head emitting liquid droplets by film boiling induced by thermal energy and a recording method utilizing such recording head.

As explained in the foregoing, the present invention, effecting the color space compression utilizing the color reproduction range judged by the generated color patches, enables effective utilization of the actual color reproduction range in the color space compression, thereby providing the images of high quality.

Also the present invention, capable of renewing the data representing the color reproduction range based on the generated image, allows to respond to the machine-to-machine fluctuation, variation by the ambient conditions of site of installation or time-dependent variation, thereby enabling effective utilization of the actual color reproduction range.

Furthermore, the present invention, judging the patches representing the approximate outermost part of the color reproduction range from plural patches, allows exact judgment of the color reproduction range.

Furthermore, the present invention, by storing data representing the color reproduction range corresponding to each of the process means, enables effective utilization of the actual color reproduction range.

Furthermore, the present invention, by transferring the data represented the judged color reproduction range to the external equipment, enables such external equipment to exactly recognize the color reproduction range of the image output device, including the machine-to-machine fluctuation, variation in the ambient conditions at the site of installation and time-dependent variation of such image output device.

9th embodiment

Figure 31:
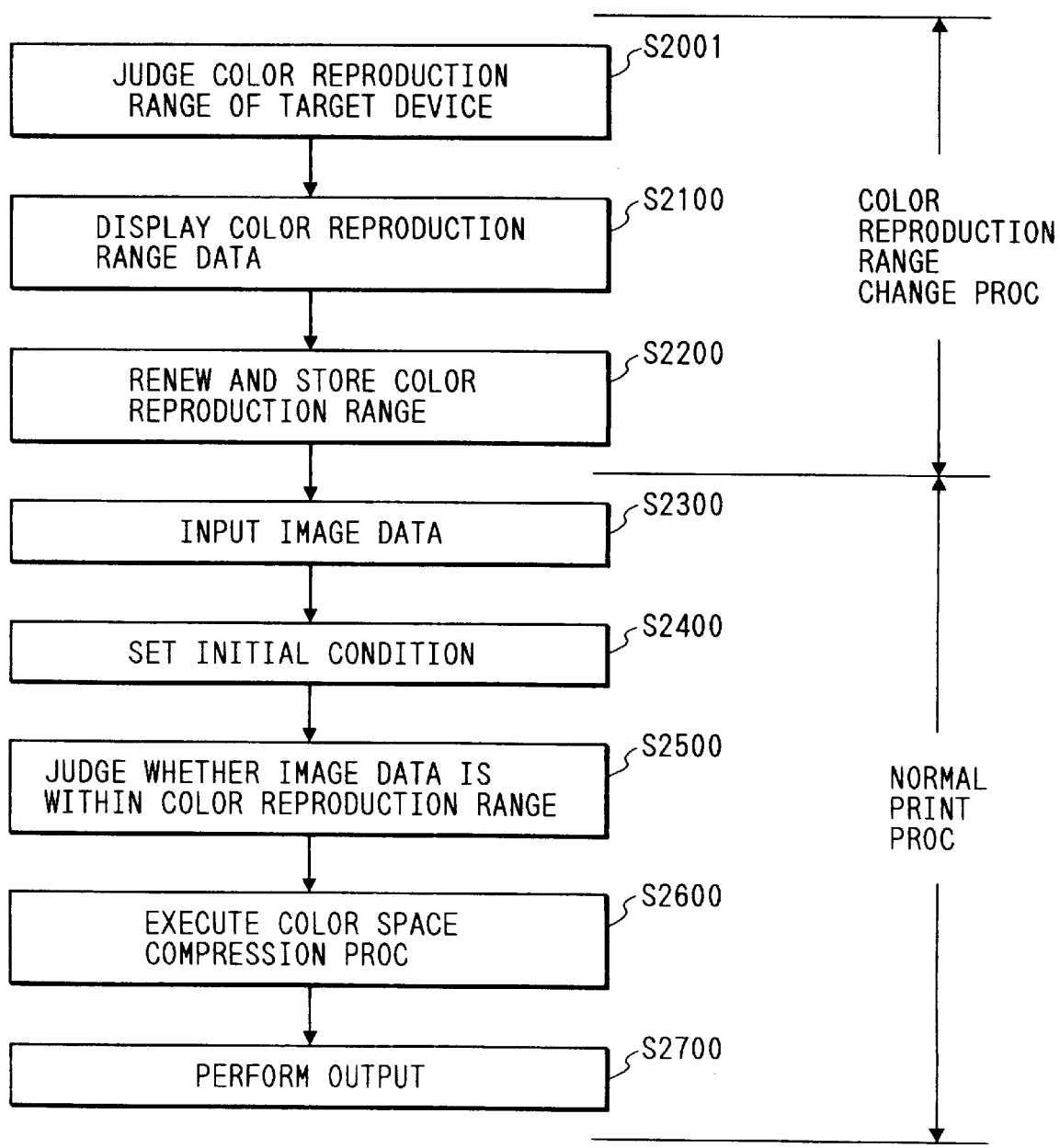
FIG. 31 is a flow chart showing an example of the control sequence of the present invention.

In the following there will be explained, as an 8th embodiment of the present invention and with reference to FIG. 31, a process flow utilizing the processes in the foregoing embodiments.

Said process flow can be divided into a color reproduction range varying process and an ordinary printing process utilizing the set color reproduction range.

At first there will be explained the color reproduction range varying process. A step S2001 judges the color reproduction range of a target device, for example by the process shown in FIG. 7. More specifically, patches corresponding to six or eight primary colors are generated by the target device, and the color reproduction range is judged by the data obtained by reading the patches with the input means. In case such judgment is executed by a host computer 301 of a system as shown in FIG. 10, the user sets the conditions based for example on a display as shown in FIGS. 8A and 8B. Examples of such conditions include the target device, designation of the scanner for reading the generated patches, and selection of the process mode.

In a step S2100, the color reproduction range judged in the step S2001 is graphically displayed on a monitor, for example as a three-dimensional body. Such graphic display allows easy understanding of the state of the color reproduction range of the target device.

Consequently, in case the color reproduction range of the target device has become narrower for example because of time-dependent variation, there can be conducted suitable measure such as repairing.

In a step S2200, the data representing the color reproduction range, obtained in the step S2001, are stored, as renewal data, in the memory of the host equipment, corresponding to each target device.

It is also possible to store such data, as a new profile including the color reproduction range corresponding to each device.

It is therefore possible to respond to the time-dependent variation of the color reproduction range or the variation resulting from difference in the ambient conditions of each device, and, in case of forming a system by connecting various equipment to a bus as shown in FIG. 10, the profile preparing function enables flexible adaptation to each equipment constituting the system.

In the following there will be explained the normal printing process. At first a step S2300 receives the image data representing the original image and stores said data in the image memory 101.

Then a step S2400 sets the initial conditions, such as the designation of the image output device, whether the color space compression is conducted, and designation of the process mode (such as three-or four-color mode).

A step S2500 judges whether the image data, obtained in the step S2300, are positioned inside the color reproduction range, indicated by the data read from the memory according to the conditions set in the step S2400.

The result of such judgment may be displayed on a monitor. It is also possible, for the user, to reset the initial conditions, based on the displayed result. Through these procedures, the user can select an optimum process.

A step S2600 effects, on the input image data, the color space compression for example of the 5th embodiment.

A step S2700 effects image output, based on thus obtained image data.

The above-explained process enables the user to select and execute the optimum process in a simple manner.

The present invention is not limited to the storage of the profile in the memory of the host equipment. It is also possible, for example, to store, in each image output device, the corresponding profile and to store such profile to the host equipment when necessitated in a protocol with the host equipment.

The present invention is not limited to the foregoing embodiments but is subject to various modifications within the scope and spirit of the appended claims.

What is claimed is:

1. A color image processing apparatus comprising:
   storing means for storing plural color data representing a gamut of an output device; and
   judging means for judging whether input color data exists on the same side as that of predetermined color data within the gamut of the output device, with respect to a triangular plane defined by three color data of the plural color data,
   wherein, when the input color data exists on the same side as that of the predetermined color data within the gamut of the output device, said judging means judges that the input image data is within the gamut of the output device.

2. An apparatus according to claim 1, wherein said plural specific color data comprises primary color data, secondary color data, white color data and dark color data.

3. An apparatus according to claim 1, further comprising output device designation means for designating one of plural output devices for which plural specific color data representing a gamut is to be stored.

4. An apparatus according to claim 2, wherein the plane is defined by three points in the plural specific color data stored in the storing means, and the gamut of the output device is represented by a dodecahedron.

5. An apparatus according to claim 1, further comprising gamut mapping means for mapping the input color data into the gamut of the output device, the gamut mapping means mapping the input color data on the basis of a judgment result of the judging means.

6. An apparatus according to claim 1, wherein the predetermined color data corresponds to color data on a luminance axis.

7. A color image processing apparatus according to claim 1, wherein said output device comprises a head which outputs liquid droplets by film boiling induced by thermal energy.

8. A color image processing apparatus comprising:
   storing means for storing plural color data representing a gamut of an output device; and
   judging means for judging whether input color data exists on the same side as that of predetermined color data within the gamut of the output device, with respect to a triangular plane defined by three color data of the plural color data,
   wherein, when the input color data exists on the same side as that of the predetermined color data within the gamut of the output device, said judging means judges that the input image data is within the gamut of the output device, and
   wherein the plural color data comprises primary color data, secondary color data, white color data and dark color data.

9. An apparatus according to claim 8, wherein the plural specific color data stored in said storing means is set on the basis of a recording material which is used in the output device.

10. An apparatus according to claim 8, wherein the predetermined color data comprises color data on a luminance axis.

11. A color image processing method comprising:
    a storing step for storing plural color data representing a gamut of an output device; and
    a judging step for judging whether input color data exists on the same side as that of predetermined color data within the gamut of the output device, with respect to a triangular plane defined by three color data of the plural color data, wherein, when the input color data exists on the same side as that of the predetermined color data within the gamut of the output device, said judging step judges that the input image data is within the gamut of the output device.

12. A method according to claim 11, wherein said plural specific color data comprises primary color data, secondary color data, white color data and dark color data.

13. A method according to claim 11, further comprising an output device designation step for designating one of plural output devices for which plural specific color data representing a gamut is to be stored.

14. A method according to claim 12, wherein the plane is defined by three points in the plural specific color data stored in the storing step, and the gamut of the output device is represented by a dodecahedron.

15. A method according to claim 13, further comprising a gamut mapping step for mapping the input color data into the gamut of the output device, the gamut mapping step mapping the input color data on the basis of a judgment result of the judging step.

16. A method according to claim 11, wherein the predetermined color data corresponds to color data on a luminance axis.

17. A color image processing method comprising:

a storing step for storing plural color data representing a gamut of an output device; and a judging step for judging whether input color data exists on the same side as that of predetermined color data within the gamut of the output device, with respect to a triangular plane defined by three color data of the plural color data, wherein, when the input color data exists on the same side as that of the predetermined color data within the gamut of the output device, said judging step judges that the input image data is within the gamut of the output device, and wherein the plural color data comprises primary color data, secondary color data, white color data and dark color data.

18. A method according to claim 17, wherein the plural specific color data stored in said storing step is set on the basis of a recording material which is used in the output device.

19. A method according to claim 17, wherein the predetermined color data comprises color data on a luminance axis.

* * * * *

UNITED STATES PATENT AND TRADEMARK OFFICE
CERTIFICATE OF CORRECTION

PATENT NO. : 6,268,930 B1
DATED : July 31, 2001
INVENTOR(S) : Kenichi Ohta et al.

It is certified that error appears in the above-identified patent and that said Letters Patent is hereby corrected as shown below:

Column 1,
Line 15, "the" should be deleted.

Column 3,
Line 63, "systemized" should read -- systematized --.

Column 6,
Line 20, "sign" should read -- signs --.

Column 7,
Line 28, "Thus determined" should read -- The thus-determined --.

Column 8,
Line 60, "In" should read -- If --; and
Line 67, "thus renewed" should red -- thus-renewed --.

Column 9,
Line 16, "is" should read -- is a --.

Column 10,
Line 35, "control" should read -- controls --;
Line 40, "coefficient a" should read -- coefficient $\alpha$ --;
Line 52, "since a" should read -- since $\alpha$ --;
Line 53, "a is" should read -- $\alpha$ is --; and
Line 63, "coefficient a" should read -- coefficient $\alpha$ --.

Column 12,
Line 4, "determined" should read -- determines --;
Line 17, "there is not conducted" should be deleted;
Line 18, "signal." should read -- signal is not conducted. --;
Line 66, "there is not conducted" should be deleted; and
Line 67, "signal" should read -- signal is not conducted --.

Column 13,
Line 6, "with a" should read -- by --.

Column 16,
Line 15, "originals" should read -- original --; and
Line 58, "in" should read -- in a --.

UNITED STATES PATENT AND TRADEMARK OFFICE
CERTIFICATE OF CORRECTION

PATENT NO. : 6,268,930 B1
DATED : July 31, 2001
INVENTOR(S) : Kenichi Ohta et al.

It is certified that error appears in the above-identified patent and that said Letters Patent is hereby corrected as shown below:

Column 17,
Line 16, "the averaging by" should read -- averaging the --.

Column 18,
Line 30, next to the table, -- (4) -- should be inserted; and
Line 62, "signals" should read -- signal --.

Column 19,
Line 24, "$d=L*^2+u*^2+^2$" should read -- $d=L*^2=u*^2+v*^2$ --.

Column 20,
Line 20, "(17)" should read -- (7) --;
Lines 45 and 46, "same" should read -- the same --; and Column 22,
Line 40, "of" should read -- of the --; and
Line 53, "represented" should read -- represented by --.

Column 23,
Line 20, "of" should read -- of the --; and
Line 55, "thus obtained" should read -- thus-obtained --.

Signed and Sealed this

Thirtieth Day of April, 2002

*Attest:*

JAMES E. ROGAN
*Attesting Officer*  *Director of the United States Patent and Trademark Office*